US011853983B1

(12) United States Patent
Zack et al.

(10) Patent No.: US 11,853,983 B1
(45) Date of Patent: *Dec. 26, 2023

(54) VIDEO REVENUE SHARING PROGRAM

(71) Applicant: Google LLC, Mountain View, CA (US)

(72) Inventors: Shenaz Zack, Foster City, CA (US);
Shishir Samir Mehrotra, Los Altos, CA (US); Lin Shi, Santa Clara, CA (US); Rui Chen, San Jose, CA (US); Armand Joseph Dijamco, San Francisco, CA (US); Yannet Interian, San Francisco, CA (US); Aaron Kwong Yue Lee, San Francisco, CA (US); Jeffrey Lee-Chan, San Jose, CA (US); Jianliang Zhao, San Jose, CA (US); Chetan Hari Narain, San Francisco, CA (US)

(73) Assignee: Google LLC, Mountain View, CA (US)

( * ) Notice: Subject to any disclaimer, the term of this patent is extended or adjusted under 35 U.S.C. 154(b) by 309 days.

This patent is subject to a terminal disclaimer.

(21) Appl. No.: 17/357,775

(22) Filed: Jun. 24, 2021

Related U.S. Application Data

(63) Continuation of application No. 16/042,854, filed on Jul. 23, 2018, now Pat. No. 11,049,081, which is a
(Continued)

(51) Int. Cl.
*G06Q 30/00* (2023.01)
*G06Q 20/10* (2012.01)
(Continued)

(52) U.S. Cl.
CPC ......... *G06Q 20/102* (2013.01); *G06Q 20/123* (2013.01); *G06Q 20/14* (2013.01);
(Continued)

(58) Field of Classification Search
CPC ....................................................... G06F 21/00
(Continued)

(56) References Cited

U.S. PATENT DOCUMENTS 7,703,030 B2 * 4/2010 Smirin ................... G06Q 30/02
715/765
7,730,030 B1 * 6/2010 Xu ......................... G06Q 10/10
707/758
(Continued)

FOREIGN PATENT DOCUMENTS

JP 2007183825 A * 7/2007 ............. G06Q 50/00
JP 2007183825 A 7/2007
(Continued)

OTHER PUBLICATIONS

Hu et al. Deriving Latent Social Impulses to Determine Longevous Videos. (Dec. 26, 2013). Retrieved online Mar. 18, 2018. https://arxiv.org/pdf/1312.7036.pdf (Year: 2013).*
(Continued)

*Primary Examiner* — James A Reagan
(74) *Attorney, Agent, or Firm* — Lowenstein Sandler LLP

(57) ABSTRACT

Videos to be hosted at an asset hosting platform and submitted by an owner of the videos are received. The videos are provided for consumption by users of the asset hosting platform. The historical data identifies a historical popularity of one or more of the videos. Whether the historical data associated with the one or more of the videos satisfies a viewership rate specifying a rate of viewership over a predetermined period of time for the one or more of the videos is determined. Responsive to determining that the historical data associated with the one or more of the videos satisfies the viewership rate, the owner is determined as eligible to participate in a video performance sharing program. A communication for a client device associated with
(Continued)

the owner of the videos to invite the owner to participate in the video performance sharing program is generated.

20 Claims, 11 Drawing Sheets

Related U.S. Application Data continuation of application No. 15/229,542, filed on Aug. 5, 2016, now Pat. No. 10,032,145, which is a continuation of application No. 13/249,162, filed on Sep. 29, 2011, now abandoned.

(51) Int. Cl.
 *G06Q 50/00* (2012.01)
 *G06Q 20/14* (2012.01)
 *G06Q 20/12* (2012.01)
 *G06Q 30/0207* (2023.01)
 *G06Q 30/0251* (2023.01)

(52) U.S. Cl.
 CPC ..... *G06Q 30/0207* (2013.01); *G06Q 30/0251* (2013.01); *G06Q 50/01* (2013.01)

(58) Field of Classification Search
 USPC ........................................................ 705/52
 See application file for complete search history.

(56) References Cited

U.S. PATENT DOCUMENTS

| | | | | |
|---|---|---|---|---|
| 8,099,757 B2 * | 1/2012 | Riedl | ............... | H04N 21/47202 725/144 |
| 8,176,057 B2 * | 5/2012 | Kim | ............... | G06Q 30/02 707/706 |
| 8,793,154 B2 * | 7/2014 | Evans | ............... | G06Q 10/10 707/706 |
| 8,943,046 B2 * | 1/2015 | Chow | ............... | G06Q 50/01 707/723 |
| 8,959,563 B2 * | 2/2015 | Riedl | ............... | H04N 21/64738 725/116 |
| 9,076,148 B2 * | 7/2015 | Valz | ............... | G06Q 30/0283 |
| 9,124,650 B2 * | 9/2015 | Maharajh | ............... | G06F 21/10 |
| 9,172,915 B2 * | 10/2015 | Nicholas | ............... | H04N 21/254 |
| 9,584,839 B2 * | 2/2017 | Riedl | ............... | H04N 21/2405 |
| 10,032,145 B1 * | 7/2018 | Zack | ............... | G06Q 20/123 |
| 2001/0056577 A1 * | 12/2001 | Gordon | ............... | H04N 21/482 725/52 |
| 2004/0267625 A1 * | 12/2004 | Feng | ............... | G06Q 10/10 715/733 |
| 2006/0195516 A1 * | 8/2006 | Beaupre | ............... | G06F 16/637 709/203 |
| 2007/0078973 A1 * | 4/2007 | Kussmaul | ............... | G06Q 10/107 709/224 |
| 2007/0106551 A1 * | 5/2007 | McGucken | ............... | G06Q 30/02 705/7.29 |
| 2007/0143281 A1 * | 6/2007 | Smirin | ............... | G06Q 30/02 707/999.005 |
| 2007/0168354 A1 * | 7/2007 | Ramer | ............... | G06F 17/30749 |
| 2007/0198510 A1 * | 8/2007 | Ebanks | ............... | G06Q 30/02 707/999.005 |
| 2007/0204308 A1 * | 8/2007 | Nicholas | ............... | H04N 7/17318 725/86 |
| 2007/0214097 A1 * | 9/2007 | Parsons | ............... | G06Q 50/01 706/12 |
| 2008/0154798 A1 * | 6/2008 | Valz | ............... | G06F 16/9535 707/E17.014 |
| 2008/0214162 A1 * | 9/2008 | Ramer | ............... | G06Q 30/02 455/414.2 |
| 2009/0089152 A1 * | 4/2009 | Davis | ............... | G06Q 30/00 705/14.4 |
| 2009/0100459 A1 * | 4/2009 | Riedl | ............... | H04N 21/2405 725/35 |
| 2009/0106697 A1 * | 4/2009 | Ward | ............... | H04N 21/6175 707/999.005 |
| 2009/0240568 A1 * | 9/2009 | Ramer | ............... | G06F 16/68 705/35 |
| 2010/0042618 A1 * | 2/2010 | Rinearson | ............... | G06F 16/24573 707/723 |
| 2010/0063877 A1 * | 3/2010 | Soroca | ............... | G06F 16/68 705/14.46 |
| 2010/0076831 A1 * | 3/2010 | Samuel | ............... | G06Q 30/02 709/204 |
| 2010/0076994 A1 * | 3/2010 | Soroca | ............... | G06F 16/635 707/769 |
| 2010/0094878 A1 * | 4/2010 | Soroca | ............... | G06F 16/9577 707/812 |
| 2010/0119053 A1 * | 5/2010 | Goeldi | ............... | G06Q 30/0277 379/265.09 |
| 2010/0257183 A1 * | 10/2010 | Kim | ............... | G06Q 30/02 707/E17.014 |
| 2010/0318484 A1 * | 12/2010 | Huberman | ............... | G06Q 30/02 706/46 |
| 2011/0225417 A1 * | 9/2011 | Maharajh | ............... | G06Q 10/06 713/150 |
| 2012/0005215 A1 * | 1/2012 | Chow | ............... | G06Q 50/01 707/748 |
| 2012/0172132 A1 * | 7/2012 | Molyneaux | ............... | A63F 13/44 463/43 |
| 2012/0173367 A1 * | 7/2012 | Soroca | ............... | G06Q 30/0267 705/26.3 |
| 2012/0179562 A1 * | 7/2012 | Soroca | ............... | G06F 16/9577 705/26.3 |
| 2012/0185899 A1 * | 7/2012 | Riedl | ............... | H04N 21/2405 725/35 |
| 2012/0290405 A1 * | 11/2012 | Talluri | ............... | G06F 21/51 705/14.69 |
| 2013/0046760 A1 * | 2/2013 | Evans | ............... | G06Q 50/01 707/E17.014 |
| 2013/0066885 A1 * | 3/2013 | Komuves | ............... | G06Q 50/01 707/748 |
| 2015/0237383 A1 * | 8/2015 | Riedl | ............... | H04N 21/23424 725/35 |
| 2016/0050447 A1 * | 2/2016 | Nicholas | ............... | H04N 21/25891 725/14 |
| 2017/0238025 A1 * | 8/2017 | Riedl | ............... | H04N 21/2405 725/116 |

FOREIGN PATENT DOCUMENTS

| | | | | | |
|---|---|---|---|---|---|
| JP | | 2008123470 A | * | 5/2008 | ............ G06Q 50/00 |
| JP | | 2008123470 A | | 5/2008 | |
| JP | | 2010061332 A | * | 3/2010 | ............ G06Q 50/00 |
| JP | | 2010061332 A | | 3/2010 | |

OTHER PUBLICATIONS

Cha et al. Analyzing the Video Popularity Characteristics of Large-Scale User Generated Content Systems. (Mar. 16, 2009). Retrieved online Feb. 16, 2021. https://core.ac.uk/download/pdf/207748145. pdf (Year: 2009).*

Jin Kim. User-Generated Content (UGC) Revolution: Critique of the Promise of Youtube. (May 2, 2010). Retrieved online Feb. 16, 2021. https://ir.uiowa.edu/cgi/viewcontent.cgi?article=1714&context=etd (Year: 2010).*

P2P File Sharing, Internet, retrieved at, http://www.p2p-weblog.com/50226711altent_Launches_global_file_registry.Phg 3 pages.

Altnet, Internet, retrieved at, http://www.globalfileregistry/.com/assets/Global_file_Registry_White_Paper.pdf, May 26, 2006, 20 pages.

Cha et al. Analyzing the Video popularity Characteristics of Large-Sscale User Generated Content Systems. (Mar. 16, 2009). Retrieved online Feb. 16, 2021. https://core.ac.uk/download/pddf/207748145. pdf (Year:2009).

Jin Kim. User-Genereated Content (UGC) revolution: Critique of the promise of youtube. (May 2, 2010). Retrieved online Feb. 16,

(56) References Cited

OTHER PUBLICATIONS 2021. ttps://uiowa.edu/cgi/viewcontent.cgi?article=1714&context-etd (Year:2010).

* cited by examiner

VIDEO REVENUE SHARING PROGRAM

RELATED APPLICATIONS

This application is a continuation of U.S. Non-Provisional application Ser. No. 16/042,854, filed Jul. 23, 2018, which is a continuation of U.S. Non-Provisional application Ser. No. 15/229,542, filed Aug. 5, 2016, now issued as U.S. Pat. No. 10,032,145 on Jul. 24, 2018, which is a continuation of U.S. Non-Provisional application Ser. No. 13/249,162 filed on Sep. 29, 2011, the entire contents of all of which are hereby incorporated by reference herein.

FIELD OF THE INVENTION

The specification relates to a system and method for sharing revenue from a video. In particular, the specification relates to a revenue sharing program that associates a video with an advertisement.

BACKGROUND

The sharing of videos on websites has developed into a worldwide phenomenon, supported by hundreds of thousands of websites. Video hosting sites, such as YouTube™ currently have billions of videos that include millions of popular videos owned by individual users. If advertisements are placed on the popular videos, revenue would be generated from the videos and the individual users would receive financial rewards for uploading the videos. However, existing systems that host videos do not allow individual users that submit popular videos to the systems to generate revenue from the videos and share the revenue with the users.

A first problem present in existing systems is that they do not provide a mechanism for individual users to share revenue generated by popular videos. For example, existing systems do not allow placing advertisements on videos owned by individual users.

A second problem present in existing systems is that they fail to predict which videos will be popular in future and miss profitable opportunities to place advertisements on future popular videos. For example, existing systems consider videos as popular videos only when the videos are already popular. As a result, existing systems fail to place advertisements on the videos before the videos become popular and miss out on revenue that can be generated during this time period.

SUMMARY

The specification overcomes the deficiencies and limitations of the prior art at least in part by providing a system and method for sharing revenue associated with a video. The system comprises a popularity evaluation module, a review module, a user invitation module, an execution module and a payment system. The popularity evaluation module retrieves popularity data and associates the popularity data with a video. The popularity data describes the popularity of the video on one or more third party sites. For example, the popularity data describes the popularity of the video on social network sites, micro-blogging sites, etc. The popularity data may also describe the popularity of the video on blogs that, based on historical data, are known to drive traffic on the internet. The popularity evaluation module evaluates the video and generates a popularity score for the video. The popularity score is an indication of the current or future popularity of the video. The review module determines, based on the popularity score, whether the video is eligible to participate in a revenue sharing program. If the video is eligible to participate in the revenue sharing program, the user invitation module sends an invitation to the video owner. The execution module associates an advertisement with the video. The payment system sends a payment to the owner.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION OF THE PREFERRED EMBODIMENTS

Figure 1:
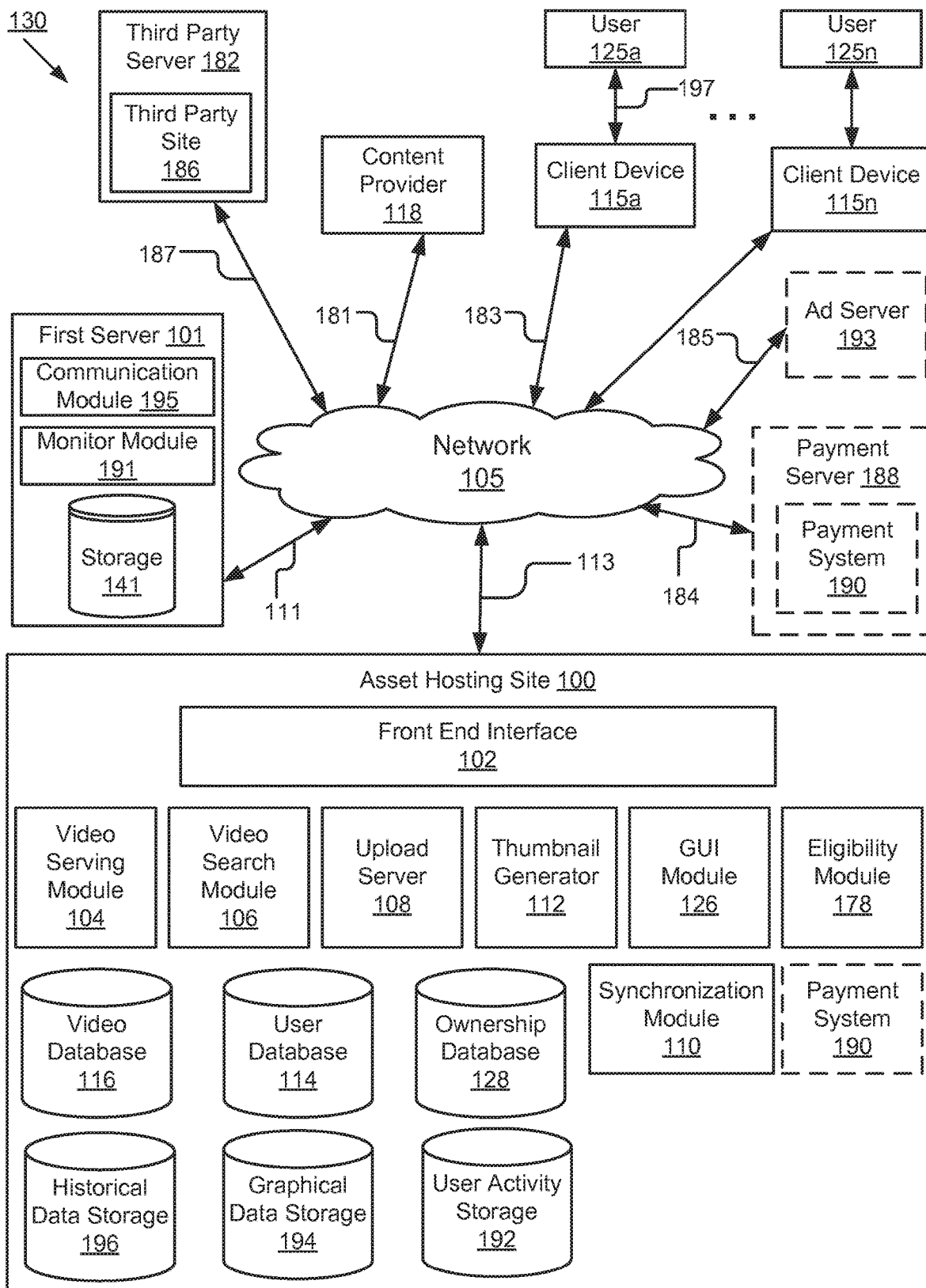
FIG. 1 is a high-level block diagram illustrating one embodiment of a system for sharing revenue associated with a video.

A system and method for sharing revenue associated with a video is described below. In the following description, for purposes of explanation, numerous specific details are set forth in order to provide a thorough understanding of the specification. It will be apparent, however, to one skilled in the art that the embodiments can be practiced without these specific details. In other instances, structures and devices are shown in block diagram form in order to avoid obscuring the specification. For example, the specification is described in one embodiment below with reference to user interfaces and particular hardware. However, the description applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

Some embodiments can take the form of an entirely hardware embodiment, an entirely software embodiment or an embodiment containing both hardware and software elements. A preferred embodiment is implemented in software, which includes but is not limited to firmware, resident software, microcode, etc.

Furthermore, some embodiments can take the form of a computer program product accessible from a computer-usable or computer-readable storage medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the various embodiments as described herein.

Finally, embodiments described herein include collection of data describing a user and/or activities of users. In one embodiment, such data is only collected upon the user providing consent to the collection of this data. In some implementations, a user is prompted to explicitly allow data collection. Further, the user may opt-in or opt-out of participating in such data collection activities. In one embodiment, the collected data is anonymized prior to performing any analysis to obtain any statistical patterns so that the identity of the user cannot be determined from the collected data.

System Overview

FIG. 1 illustrates a block diagram of a system 130 for sharing revenue associated with a video according to one embodiment. The illustrated embodiment of the system 130 includes client devices 115a, 115n that are accessed by users 125a, 125n, a content provider 118, an asset hosting site 100 including an eligibility module 178, a first server 101, a third party server 182, an advertisement server 193 ("ad server 193") and a payment server 188. In the illustrated embodiment, these entities are communicatively coupled via a network 105. The ad server 193 and the payment server 188 are depicted in FIG. 1 using dotted lines to indicate that they are optional features of the system 130.

Although only two client devices 115a, 115n are illustrated, persons having ordinary skill in the art will recognize that any number of client devices 115n are available to any number of users 125n. Persons having ordinary skill in the art will also appreciate that any number of users 125n can use (or access) a single client device 115n, and that there can be any number of content providers 118. Furthermore, while only one network 105 is coupled to the client devices 115a, 115n, the asset hosting site 100, the content provider 118, the first server 101, the third party server 182, the ad server 193 and the payment server 188, in practice any number of networks 105 can be connected to the client devices 115a, 115n, the asset hosting site 100, the content provider 118, the first server 101, the third party server 182, the ad server 193 and the payment server 188. Persons having ordinary skill in the art will also appreciate that while one asset hosting site 100, first server 101, third party server 182, ad server 193 and payment server 188 are depicted in FIG. 1, the system 130 could include one or more asset hosting sites 100, first servers 101, third party servers 182, ad servers 193 and payment servers 188.

The network 105 is a conventional type, wired or wireless, and may have any number of configurations such as a star configuration, token ring configuration or other configurations known to those skilled in the art. Furthermore, the network 105 may comprise a local area network (LAN), a wide area network (WAN) (e.g., the Internet), and/or any other interconnected data path across which multiple devices may communicate. In yet another embodiment, the network 105 may be a peer-to-peer network. The network 105 may also be coupled to or includes portions of a telecommunications network for sending data in a variety of different communication protocols. For example, the network 105 is a 3G network or a 4G network. In yet another embodiment, the network 105 includes Bluetooth communication networks or a cellular communications network for sending and receiving data such as via short messaging service (SMS), multimedia messaging service (MMS), hypertext transfer protocol (HTTP), direct data connection, WAP, e-mail, etc.

In the illustrated embodiment, the content provider 118 is communicatively coupled to the network 105 via signal line 181. The client device 115a is coupled to the network 105 via signal line 183. The user 125a interacts with the client device 115a as represented by signal line 197. Client device 115n and user 125n are coupled and interact in a similar manner. The first server 101 is communicatively coupled to the network 105 via signal line 111. The third party server 182 is communicatively coupled to the network 105 via signal line 187. The asset hosting site 100 is communicatively coupled to the network 105 via signal line 113. The payment server 188 is communicatively coupled to the network 105 via signal line 184. The ad server 193 is communicatively coupled to the network 105 via signal line 185.

The third party server 182 is a hardware server that is configured to host a third party site 186. A third-party site is code and routines configured, when executed by a processor (not pictured) of the third party server 182, to provide one or more of a social network website, microblog website, messaging board and an electronic mail service ("e-mail service"). In one embodiment, a third-party site 186 is a website that implements different features of one or more of a social network website, microblog website, messaging board and an e-mail service. For example, the third party site 186 is a social network that also provides e-mail service. In one embodiment, the third-party site 186 is a blog or other website that, based on historical data stored in storage 196, are known to drive traffic on the internet.

In one embodiment, the third party site 186 hosts videos uploaded by one or more content providers 118 and/or users 125n of client devices 115n. For example, the third party site 186 is a social network that hosts videos uploaded by a user 125n of a client device 115n. A user 125n uses a client device 115n to upload a video to the third party site 186. Other users 125n view the video on the third party site 186 (a user 125n that views a video is referred to herein as a "viewer"). Some of these viewers will "like" the video or provide comments about the video. As a result, the video becomes accessible via a larger number of users accounts that comprise the third party site 186. Some of the viewers may share the video by embedding the video (or a link to the video) on another third party site 186 hosted, for example, by another third party server 182. As a result, the video becomes accessible via a larger number of third party sites 186. The video may be shared so that it becomes accessible on the asset hosting site 100. Of course, the video may have been initially uploaded to the asset hosting site 100 and then subsequently shared on one or more third party sites 186. As the video is accessible by more user accounts and more third party sites 186, the video may become "viral."

A viral video is a video that has been determined to be viral by the monitor module 191 described below with reference to the first server 101. The monitor module 191 determines a video to be viral based at least in part on user activity. User activity includes, for example, video views, comments, shares, "likes," "dislikes," "favorites," and links. For example, the monitor module 191 determines a video to be viral based on whether the video is viewed a predetermined number of times and/or viewed by a predetermined number of users of one or more third party sites 186 and/or the asset hosting site 100. In one embodiment, the monitor module 191 determines a video to be viral based at least in part on one or more of a predetermined number of comments for a video, the number of times a video is shared, a predetermined number of times a video is "liked," a predetermined number of times a video is "disliked," a predetermined number of times a video is "favorited," and a predetermined number of times a video is linked to by a user 125n. An administrator of the first server 101 and/or the asset hosting site 100 provides inputs to the monitor module 191 that define the predetermined variables that determine when a video is viral or is projected to become viral. Video views, comments, shares, likes, dislikes and links are referred to herein as "user activities" or "user actions." In one embodiment, the eligibility module 178 determines the function of determining whether a video is viral or is trending towards becoming viral using the same criteria described above for the monitor module 191.

In one embodiment, a video is determined to be likely to become viral if the video is mentioned or accessible on blogs or other websites that, based on historical data stored in storage 196, are known to drive traffic on the internet. Thus, in one embodiment, whether a video is popular is determined based on whether the video is mentioned or accessible on blogs or other websites such as these.

The first server 101 is a hardware server device. For example, the first server 101 is a hardware server operated by Google® of Mountain View, California. In one embodiment, the first server 101 is operated by an entity other than Google®. The first server 101 comprises, among other things, a communication module 195, monitor module 191 and a first storage device 141. The first server 101 additionally comprises a processor (not pictured), a memory (not pictured) and other components conventional to a hardware server device (e.g., firewall, network card, etc.)

The monitor module 191 is code and routines configured, when executed by the processor of the first server 101, to monitor user activities with videos hosted on one or more third party sites 186 and/or the asset hosting site 100 and determine whether a video has become viral or is likely to become viral in the future. The monitor module 191 is stored on a tangible non-transitory memory of the first server 101.

In one embodiment, the monitor module 191 includes a parser, a web crawler or a similar computer program sub-module that is configured, when executed by the processor of the first server 101, to monitor user activities with videos hosted on one or more third party sites 186 and/or the asset hosting site 100. The monitor module 191 collects data describing user activity with videos and stores this data in the first storage device 141. This data is referred to herein as "popularity data" and "viewership data." An administrator of the first server 101 provides inputs to the monitor module 191 that define the predetermined variables that determine when a video is viral or is likely to become viral. The monitor module 191 stores these inputs in a memory of the first server 101. For example, these inputs are stored by the monitor module 191 in the first storage device 141. The monitor module 191 includes a sub-module configured, when executed by the processor of the first server 101, to compare the user activities detected by the monitor module 191 against the inputs defining when a video is viral (or likely to become viral) and determine whether one or more videos are viral based at least in part on this comparison.

In one embodiment, one or more of the third party sites 186 and/or the asset hosting site 100 establish a feed with the monitor module 191 and transmit data to the monitor module 191 describing user activity with one or more videos hosted on the third party sites 186 and/or the asset hosting site 100. In this embodiment, the monitor module 191 comprises computer code configured, when executed by a processor of the first server 101, to receive the feed and store the data in the first storage device 141. In one embodiment, the monitor module 191 receives data describing user activity with videos using one or more of a parser, a web crawler and a feed. Thus, the monitor module 191 can receive data describing user activity with videos via more than one source.

In one embodiment, the monitor module 191 embeds a cookie in a third party site 186 and receives communications from the cookie reporting the user activity used to determine whether a video is becoming viral.

The first storage device 141 is a non-transitory memory that stores data collected by the monitor module 191 and used by the asset hosting site 100 to implement a revenue sharing system. In one embodiment, the first storage device 141 stores videos and video data associated with the videos. Video data is any data associated with a video including popularity data. In one embodiment, the popularity data includes one or more of reference data, viewership data, favorite counts (e.g., the number of times a video is marked as a favorite video), ratings, comments, liked counts (e.g., the number of times a video is marked as a liked video), disliked counts (e.g., the number of times a video is marked as a disliked video) and sharing counts (e.g., the number of times a video is shared on a third-party website), etc.

The reference data is data describing how many times a video is referred to in the text of a site such as the third party site 186. For example, the text of an article on the third party site 186 refers to a video hosted on another third party site 186. The article includes a link to the video as it is hosted on the other third party site 186. The monitor module 191 parses the article and determines that the article is referring to the video. The reference data includes data describing this reference.

The viewership data is data describing how many times a video has been viewed in a predetermined period of time (i.e., a viewership rate) on one or more video hosting sites. In one embodiment, the viewership data describes viewership rates of a video on the asset hosting site 100, one or more third party sites 186 and/or one or more other video hosting sites similar to the asset hosting site 100. For example, the viewership data describes a video has 5,000 views in a 24-hour period. The reference data is data describing references to a video on one or more websites and how references on these websites drive the rate of viewing. For example, the reference data describes that a video published in a video hosting site (e.g., www.youtube.com) has been referred to by one or more third party sites 186 and 200 views are resulted from references in the one or more third party sites 186 within 5 hours. In one embodiment, a reference in a third party site 186 includes one of a hyperlink to the video, an embedded version of the video in the third party site 186 and an introduction for the video.

In one embodiment, the data stored on the first server 101 describing the user 125*n* and the user's 125*n* activities is only collected upon the user 125*n* providing consent to the collection of this data. In some implementations, a user 125*n* is prompted to explicitly allow data collection. Further, the user 125*n* may opt-in or opt-out of participating in such data collection activities. In one embodiment, the collected data is anonymized prior to performing any analysis to obtain any statistical patterns so that the identity of the user 125*n* cannot be determined from the collected data.

The communication module 195 is code and routines used by the first server 101 to synchronize data stored on the first storage device 141 with the user activity storage 192 stored on the asset hosting site 100. In one embodiment, the communication module 195 is communicatively coupled to the first storage 141 and the network 105. The communication module 195 communicates with the asset hosting site 100 via the network 105 to synchronize data stored on the first server 101 with data stored in the user activity storage 192. For example, the communication module 195 communicates with the synchronization module 110 via the network 105 and the front end interface 102 to synchronize the popularity data (e.g., reference data, viewership data, etc.) stored in the first storage 141 with data stored in the user activity storage 192. The user activity storage 192 is described in further detail below with reference to the asset hosting site 100.

The asset hosting site 100 is any system that allows users to access video content via searching and/or browsing interfaces. An example of an asset hosting site 100 is the YOUTUBE' web site, found at www.youtube.com. Other video hosting sites are known as well, and are adapted to operate according to the teachings disclosed herein. It will be understood that the term "website" represents any computer system adapted to serve content using any internet working protocols, and is not intended to be limited to content uploaded or downloaded via the Internet or the HTTP protocol.

In one embodiment, sources of the video content on the asset hosting site 100 are from uploads of videos by users, searches or crawls of other websites or databases of videos, or the like, or any combination thereof. For example, in one embodiment, the asset hosting site 100 is configured to allow upload of video content by users 125*n* and/or content providers 118. In another embodiment, the asset hosting site 100 is configured to obtain videos from other sources by crawling such sources or searching such sources in real time.

To simplify and clarify the present description, the video content received and shared by the asset hosting site 100 will be referred to as videos, video files, or video items. Persons having ordinary skill in the art will recognize that the asset hosting site 100 can receive and share content of any media type and file type. For example, the asset hosting site 100 shares content such as a video, an audio, a combination of video and audio, an image such as a JPEG or GIF file and/or a text file, etc.

The asset hosting site 100 is communicatively coupled to the network 105 via signal line 113. In the illustrated embodiment, the asset hosting site 100 includes: a front end interface 102; a video serving module 104; a video search module 106; an upload server 108; a synchronization module 110; a thumbnail generator 112; a graphical user interface module 126 ("GUI module 126"); a user database 114; a video database 116; an ownership database 128; a historical data storage 196; a graphical data storage 194; a user activity storage 192; an eligibility module 178 and a payment system 190. The payment system 190 is depicted in FIG. 1 using a dashed line to indicate that it is an optional feature of the asset hosting site 100. The components of the asset hosting site 100 are communicatively coupled to one another. Other conventional features, such as firewalls, load balancers, authentication servers, application servers, failover servers, site management tools, and so forth are not shown so as not to obscure the feature of the system.

In one embodiment, the illustrated components of the asset hosting site 100 are implemented as single pieces of software or hardware or as multiple pieces of software or hardware. In general, functions described in one embodiment as being performed by one component, can also be performed by other components in other embodiments, or by a combination of components. Furthermore, functions described in one embodiment as being performed by components of the asset hosting site 100 are performed by one or more client devices 115n and/or content providers 118 in other embodiments if appropriate. In one embodiment, the functionality attributed to a particular component is performed by different or multiple components operating together.

Each of the various servers and modules on the asset hosting site 100 is implemented as a server program executing on a server-class computer comprising one or more central processing units ("CPU," or "CPUs" if plural), memory, network interface, peripheral interfaces, and other well-known components. In one embodiment, the computers themselves run an open-source operating system such as LINUX, have one or more CPUs, 1 gigabyte or more of memory, and 100 gigabytes or more of disk storage. In one embodiment, other types of computers are used, and it is expected that as more powerful computers are developed in the future, they are configured in accordance with the teachings disclosed herein. In another embodiment, the functionality implemented by any of the elements is provided from computer program products that are stored in one or more tangible, non-transitory computer-readable storage mediums (e.g., random access memory ("RAM"), flash, solid-state drive ("SSD"), hard disk drive, optical/magnetic media, etc.).

The front end interface 102 is an interface that handles communication with the first server 101, client devices 115n, ad server 193 and payment server 188 via the network 105. For example, the front end interface 102 receives video files uploaded from the content provider 118 and delivers the video files to the upload server 108. In one embodiment, the front end interface 102 receives requests from users 125n of the client 115n and delivers the requests to the other components of the asset hosting site 100 (e.g., the video search module 106, the video serving module 104, etc.). For example, the front end interface 102 receives a video search query from a user 125n and sends the video search query to the video search module 106.

The upload server 108 receives video files from the content provider 118 via the front end interface 102. In one embodiment, the upload server 108 processes the video files and stores the video files in the video database 116. For example, the upload server 108 assigns a video identification (video ID) to a video and stores the video and the video ID in the video database 116. Further examples of processing a video file by the upload server 108 include performing one or more of: formatting; compressing; metadata tagging; and content analysis, etc.

The video database 116 is a storage system that stores video files shared by the asset hosting site 100 with the users 125n. In one embodiment, the video database 116 stores the video files processed by the upload server 108. In another embodiment, the video database 116 stores metadata of the video files. For example, the video database 116 stores one or more of: a title; description; tag information; and administrative rights of a video file. The administrative rights of a video file include one or more of: the right to delete the video file; the right to edit information about the video file; and the right to associate the video file with an advertisement, etc. In one embodiment, some or all of the metadata of a video file is provided by the content provider 118. For example, the content provider 118 provides a title and a short description of a video when uploading the video to the asset hosting site 100.

The video search module 106 is code and routines that, when executed by a processor (not pictured), processes any search queries received by the front end interface 102 from a user 125n using a client device 115n. A search query from a user 125n includes search criteria such as keywords that, for example, identify videos the user 125n is interested in viewing. In one embodiment, the video search module 106 uses the search criteria to query the metadata of video files stored in the video database 116 and returns the search results to the client device 115n via the front end interface 102. For example, if a user 125n provides a keyword search query to the video search module 106 via the front end interface 102, the video search module 106 identifies videos stored in the video database 116 matching the keyword and returns search results (e.g., video IDs, titles, descriptions, thumbnails of the identified videos) to the user 125n via the front end interface 102.

The video serving module 104 is code and routines that, when executed by a processor (not pictured), processes requests for videos and serves videos to client devices 115n. For example, the video serving module 104 receives a request for viewing a video from a user 125n of the client device 115n, retrieves the video from the video database 116 based at least in part on the request and presents the video to the client device 115n via the front end interface 102.

In one embodiment, the video serving module 104 receives a request from a client device 115n to access a video when the user 125n clicks on a link to the video. The request received from the client device 115n includes the video ID of the video. In one embodiment, the video ID is included automatically in the request once the user 125n clicks on the link for the video. The video serving module 104 uses the video ID to search and locate the video in the video database 116. Once the requested video is located, the video serving module 104 sends the video to the client device 115n via the front end interface 102. In one embodiment, the video is presented to the user 125n on a web browser stored and executed by the client device 115n. Metadata associated with the video such as the title and description of the video is also presented to the user 125n. In one embodiment, the video serving module 104 stores the video ID of the video in the user database 114 after sending the video to the client device 115n so that a video viewing history of the user 125n is stored in the user database 114.

The user database 114 is a storage system that stores data and/or information associated with any user. For example, the user database 114 stores video IDs of video files uploaded by a user 125n so that a video uploading history of the user 125n is maintained in the user database 114. The user database 114 also stores video IDs of video files that the user 125n has accessed from the video database 116 for viewing so that a video viewing history for the user 125n is stored in the user database 114. In one embodiment, the user 125n is identified by using a unique user name and password and/or by using the user's 125n internet protocol address. For example, a user 125n participating in the revenue sharing program uses their unique user name and password to sign-in to the asset hosting site 100.

The thumbnail generator 112 is code and routines that, when executed by a processor (not pictured), generates a thumbnail for a video. A thumbnail is an image that represents a video on the asset hosting site 100. For example, the thumbnail generator 112 analyzes the video and selects a frame from the video as the thumbnail. In one embodiment, the thumbnail generator 112 provides one or more images for the video and allows a publisher (e.g., a content provider 118 or a user 125n uploading the video using a client device 115n) to select one image as the thumbnail.

The graphical data storage 194 is a storage system that stores graphical code for generating graphical user interfaces ("GUIs") for display to the user 125n in the browser of the client device 115n.

The GUI module 126 is code and routines that, when executed by a processor (not pictured), generates graphical data for providing a user interface that displays information to a user and/or allows a user to input information via the user interface. In one embodiment, the GUI module 126 provides the functionality described below for receiving inputs from users 125n and/or displaying information to users 125n. The GUI module 126 is communicatively coupled to the front end interface 102. The GUI module 126 retrieves graphical data from the graphical data storage 195 and transmits the graphical data to the front end interface 102. The front end interface 102 communicates with the network 105 to transmit the graphical data to a processor-based computing device communicatively coupled to the network 105. For example, the front end interface 102 transmits the graphical data to one or more of the content provider 118 and client device 115n. One or more of the content provider 118 and the client device 115n receives the graphical data and generates a GUI displayed on a display device (e.g., a monitor) communicatively coupled to the processor-based computing device. The GUI is displayed on a display device and viewed by a human user (e.g., a user such as user 125n). The GUI includes one or more fields, drop down boxes or other conventional graphics used by the human user to provide inputs that are then transmitted to the asset hosting site 100 via the network 105. Data inputted into the GUI is received by the front end interface 102 and stored in one or more the video database 116, user database 114, ownership database 128 and the user activity storage 192.

In another embodiment, the GUI module 126 generates graphical data for providing a user interface for displaying information to a user such as a tutorial, terms and agreements, monetization options and other information related to the revenue sharing program. In yet another embodiment, the GUI module 126 generates graphical data for providing a user interface that displays information to a user and allows the user to input information via the user interface.

In one embodiment, the GUI module 126 transmits graphical data to the client device 115n that causes the browser of the client device 115n to display a GUI that provides the user 125n with a graphical input that the user 125n can use to explicitly opt-in or opt-out of data collection by the asset hosting site 100 (and/or the first server 101). If the user 125n provides an input opting out of data collection, the asset hosting site 100 and/or the first server 101 does not collect data describing the user 125n or the user's 125n activities. In one embodiment, if the user opts to participate in the data collection, the asset hosting site 100 and/or the first server 101 anonymize any data collected describing the user 125n and the user's 125n activities so that the identity of the user 125n cannot be determined from the collected data. In one embodiment, the GUI includes a written description of a privacy policy that describes how the collected data is anonymized and how the collected data will be used.

The user activity storage 192 is a storage system that stores data describing user activity on the asset hosting site 100 and one or more third party sites 186. For example, the user activity storage 192 stores popularity data as described above with reference to the first storage device 141. The user activity storage 192 is a non-transitory memory that stores videos, data associated with the videos, user profile information and other information associated with the revenue sharing program. In one embodiment, the user activity storage 192 is synchronized with the first storage device 141 by the communication module 195 and the synchronization module 110 to store popularity data on the user activity storage 192. For example, the user activity storage 192 synchronizes with the first storage device 141 and stores popularity data such as reference data, viewership data, favorite counts, ratings, comments, liked counts, disliked counts and sharing counts, etc.

In one embodiment, the user activity storage 192 stores user profile information. User profile information is information associated with a user. For example, the user profile information includes one or more of a user name, an indication indicating whether the user is participating in the revenue sharing program, a monetization account, videos submitted by the user that have participated in the revenue sharing program and historical data (e.g., stored in storage 196) such as popularity and profitability of videos submitted by the users. Persons of ordinary skill in the art will recognize that the user profile information may include other information related to the user. In one embodiment, the user profile information is stored in the user database 114 and not stored in the user activity storage 192.

In one embodiment, the data stored on the asset hosting site 100 describing the user 125n and the user's 125n activities is only collected upon the user 125n providing consent to the collection of this data. In some implementations, a user 125n is prompted to explicitly allow data collection. Further, the user 125n may opt-in or opt-out of participating in such data collection activities. In one embodiment, the collected data is anonymized prior to performing any analysis to obtain any statistical patterns so that the identity of the user 125n cannot be determined from the collected data.

The synchronization module 110 is code and routines that, when executed by a processor (not pictured), communicates with the communication module 195 via the front end interface 102 and the network 105 to synchronize popularity data stored on the first storage device 141 with the popularity data stored in the user activity storage 192 so that the user activity storage includes updated user activity storage 192.

The eligibility module 178 is code and routines that, when executed by a processor (not pictured), determines whether a video and/or a user 125n is eligible to participate in a revenue sharing program. For example, the eligibility module 178 determines whether a video is eligible to participate in a revenue sharing program and invites an owner of an eligible video to join the revenue sharing program. In one embodiment, a video is an eligible video if it is owned by the user and meets a threshold of popularity identified by an administrator of the asset hosting site 100. For example, a video meets the threshold of popularity to be eligible to participate in the revenue sharing program if the video is viral is or is projected to become viral. In one embodiment, the owner of a video is the content provider 118 or a user 125n that has filmed the video and uploaded the video to an asset hosting site 100.

The revenue sharing program is a program that generates revenue from an eligible video and shares the revenue with the owner of the video. For example, the asset hosting site 100 hosts a webpage including a media player for playing a video uploaded by a user 125n. The asset hosting site 100 manages the revenue sharing program. The user 125n owns the video and is a member of the revenue sharing program. The asset hosting site 100 configures playback of the video so that a linear or non-linear advertisement is included in the video playback. Examples of linear advertisements include pre-roll advertisements, post-roll advertisements and advertisements included in middle video playback. Examples of non-linear advertisements include overlay advertisements. In one embodiment, the asset hosting site 100 configures the webpage so that it includes banner advertisements and/or pop-up advertisements. As a part of the revenue sharing program, the asset hosting site 100 shares a portion of the revenue generated from one or more the advertisements with the owner of the video.

In one embodiment, the advertisements are provided by the ad server 193. The ad server 193 may be operated by different entity than the one that operates the asset hosting site 100 (i.e., the ad server 193 may be a third party ad server 193). The ad server 193 is depicted in FIG. 1 with a dashed line to indicate that it is an optional feature of the system 130. In one embodiment, the asset hosting site 100 includes one or more modules and storage devices configured to provide the functionality of the ad server 193.

In one embodiment, the asset hosting site 100 generates revenue from an eligible video by renting the video to third parties. For example, the owner of the video is the first user 125a. The first user 125a is a participant in the revenue sharing program and the video is eligible for this program. The second user 125n pays the asset hosting site 100 money to rent the owner's video for a fixed period of time. The asset hosting site 100 shares a portion of the revenue generated from this transaction with the first user 125a since he or she is the owner of the video. Video rentals are described in more detail below with reference to FIG. 2.

The owner of the asset hosting site 100 is herein referred to as a "publisher" of the eligible video. The publisher receives revenue by collecting a fee from an advertiser for placement of an advertisement ("ad") on the eligible video or from a user 125n that rents the eligible video from the asset hosting site 100. In one embodiment, the eligibility module 178 creates a monetization account for an owner of an eligible video to share the revenue with the owner of the video.

In one embodiment, the eligibility module 178 is configured, when executed by a processor (not pictured), to perform the methods 400, 500, 600, 700 of FIGS. 4-7C. The eligibility module 178 is described in more detail below with reference to FIGS. 2-7C.

The historical data storage 196 is a storage system that stores historical data. Historical data is data describing the past popularity and profitability of videos uploaded by users 125n. In one embodiment, the eligibility module 178 determines whether a video is eligible for the revenue sharing program based at least in part on the historical data. In one embodiment, the historical data includes data identifying blogs and other websites that are known to drive traffic on the internet.

The payment system 190 is code and routines that, when executed by a processor (not pictured), sends revenue generated from monetizing a video to the owner of the video. For example, the payment system 190 keeps track of revenue generated from advertisements associated with videos and sends an amount of money to the owner of a video based on this data. In one embodiment, the payment system 190 is comprised within the asset hosting site 100. In another embodiment, the payment system 190 is comprised within the payment server 188.

The payment server 188 is any hardware server device. For example, the payment server 188 is a hardware server operated by Google® of Mountain View, California. In one embodiment, the payment server 188 is communicatively coupled to the network 105 via a signal line 184. The payment system 190 sends a payment to the owner of a video via the network 105. For example, the payment system 190 uses the network 105 to electronically wire money to a banking account owned by the owner of the video. The payment server 188 is depicted with a dashed line in FIG. 1 to indicate that it is an optional feature of the system 130. For example, if the payment system 190 is comprised in the asset hosting site 100, the system 130 does not include a payment server 188.

The client device 115a, 115n is any computing device. For example, the client device 115a, 115n is a personal computer ("PC"), smart phone, tablet computer (or tablet PC), etc. One having ordinary skill in the art will recognize that other types of client devices 115a, 115n are possible. In one embodiment, the system 130 comprises a combination of different types of client devices 115a, 115n. For example, a plurality of other client devices 115n is any combination of a personal computer, a smart phone and a tablet computer.

The client device 115a, 115n comprises a browser (not pictured). In one embodiment, the browser is code and routines stored in a memory of the client device 115a, 115n and executed by a processor of the client device 115a, 115n. For example, the browser is a browser application such as Google Chrome. The user 125a, 125n is a human user of the client device 115a, 115n.

Eligibility Module

Figure 2:
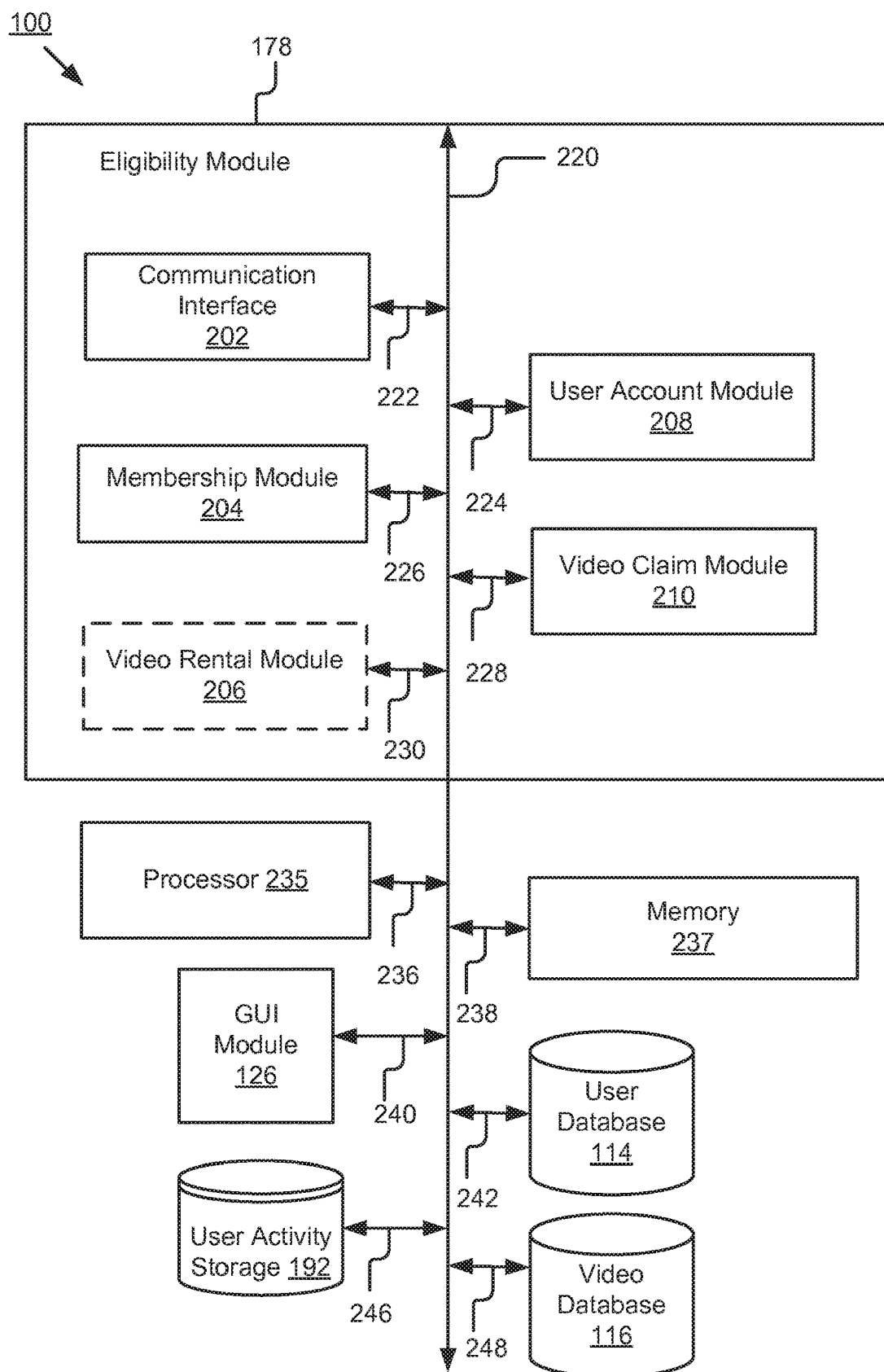
FIG. 2 is a block diagram illustrating one embodiment of an asset hosting site.

Referring now to FIG. 2, the eligibility module 178 is shown in more detail. FIG. 2 is a block diagram depicting an embodiment of the asset hosting site 100. Depicted in FIG. 2 are the eligibility module 178, a processor 235, a memory 237, the GUI module 126, the user database 114, the user activity storage 192 and the video database 116. In one embodiment, the components of the asset hosting site 100 not depicted in FIG. 2 are stored in the memory 237. For example, the memory 237 stores one or more of one or more of the video serving module 104, video search module 106, upload server 108, thumbnail generator 112, synchronization module 110, payment system 190, the ownership database 128, the historical data storage 196 and the graphical data storage 194.

In one embodiment, the processor 235 is a computer processor of the asset hosting site 100, and can be used to execute code and routines that comprise one or more of the video serving module 104, video search module 106, upload server 108, thumbnail generator 112, GUI module 126, synchronization module 110, payment system 190 and the eligibility module 178. The processor 235 comprises an arithmetic logic unit, a microprocessor, a general purpose controller or some other processor array to perform computations and execute the video serving module 104, video search module 106, upload server 108, thumbnail generator 112, GUI module 126, synchronization module 110, payment system 190 and the eligibility module 178. The processor 235 is coupled to the bus 220 for communication with the other components of the asset hosting site 100. Processor 235 processes data signals and may comprise various computing architectures including a complex instruction set computer (CISC) architecture, a reduced instruction set computer (RISC) architecture, or an architecture implementing a combination of instruction sets. Although only a single processor is shown in FIG. 2, multiple processors may be included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible. The processor 235 is communicatively coupled to the bus 220 via signal line 236.

The memory 237 is a non-transitory storage medium. The memory 237 stores instructions and/or data that may be executed by the processor 235. For example, the memory 237 stores one or more of the modules of the asset hosting site 100 described above with reference to FIG. 1. The memory 237 is communicatively coupled to the bus 220 for communication with the other components of the asset hosting site 100. In one embodiment, the instructions and/or data stored on the memory 237 comprises code for performing any and/or all of the techniques described herein. The memory 237 is a dynamic random access memory (DRAM) device, a static random access memory (SRAM) device, flash memory or some other memory device known in the art. In one embodiment, the memory 237 also includes a nonvolatile memory or similar permanent storage device and media such as a hard disk drive, a floppy disk drive, a CD-ROM device, a DVD-ROM device, a DVD-RAM device, a DVD-RW device, a flash memory device, or some other non-volatile storage device known in the art. The memory 237 is communicatively coupled to the bus 220 via signal line 238. In one embodiment, the memory 237 stores the eligibility module 178 and the sub-modules 202, 204, 206, 208 and 210 that are included in the eligibility module 178.

In one embodiment, the eligibility module 178 comprises a communication interface 202, a membership module 204, a video rental module 206, a user account module 208 and a video claim module 210. The video rental module 206 is depicted with a dashed line in FIG. 2 to indicate that it is an optional feature of the eligibility module 178.

The communication interface 202 is software including routines for handling communications between the membership module 204, video rental module 206, user account module 208, the video claim module 210, memory 237, the user activity storage 192 and the other components of the asset hosting site 100. In one embodiment, the communication interface 202 is a set of instructions executable by the processor 235 to provide the functionality described below for handling communications between components of the eligibility module 178 and other components of the asset hosting site 100. In another embodiment, the communication interface 202 is stored in the memory 237 and is accessible and executable by the processor 235. In either embodiment, the communication interface 202 is adapted for cooperation and communication with the processor 235 and other components of the asset hosting site 100 via signal line 222.

In one embodiment, the communication interface 202 receives inputs from a user operating on a client device 115n and delivers the inputs from the user to other components of the asset hosting site 100. For example, the communication interface 202 receives an opt-in request from a user 125n to participate in data collection and stores this request in a memory of the asset hosting site 100 (e.g., memory 237). The membership module 204 is described in further detail below.

The membership module 204 is code and routines that, when executed by the processor 235, determines whether a video and/or a user 125n that owns the video is eligible to participate in the revenue sharing program. In one embodiment, the membership module 204 is a set of instructions executable by the processor 235 to provide the functionality described below with reference to FIGS. 3-7C for determining eligibility of a video and/or a user 125n to participate in the revenue sharing program. In another embodiment, the membership module 204 is stored in the memory 237 and is accessible and executable by the processor 235. In either embodiment, the membership module 204 is adapted for cooperation and communication with the processor 235 and other components of the asset hosting site 100 via signal line 226. The membership module 204 is described in further detail below with reference to FIGS. 3-7C.

The video rental module 206 is software including routines for renting a video to a user 125n and sharing revenue received by renting the video with an owner of the video. In one embodiment, the video rental module 206 is a set of instructions executable by the processor 235 to provide the functionality described below for renting a video to a user 125n and sharing revenue with an owner of the video. In another embodiment, the video rental module 206 is stored in the memory 237 and is accessible and executable by the processor 235. In either embodiment, the video rental module 206 is adapted for cooperation and communication with the processor 235 and other components of the asset hosting site 100 via signal line 230.

In one embodiment, the video rental module 206 rents a video to a user 125n and receives a rental fee paid by the user 125n. The video rental module 206 tracks fees earned from different videos and stores this information in the memory 237. The video rental module 206 determines the portion of revenue attributable to a particular video and shares this revenue with the owner of the video. In another embodiment, the video rental module 206 generates revenue by selling a copy of a video to a user 125n and shares the revenue with an owner of the video.

The user account module 208 is software including routines for creating and/or activating a monetization account. In one embodiment, the user account module 208 is a set of instructions executable by the processor 235 to provide the functionality described below for creating and/or activating a monetization account. In another embodiment, the user account module 208 is stored in the memory 237 and is accessible and executable by the processor 235. In either embodiment, the user account module 208 is adapted for cooperation and communication with the processor 235 and other components of the asset hosting site 100 via signal line 224.

In one embodiment, the user account module 208 receives a request from a user 125n to create a monetization account. A monetization account is an account that allows an owner of a video to receive a portion of the revenue generated from video advertisements, video rentals and video sales. For example, a monetization account is a web-based service such as an ad serving account (e.g., Google AdSense™ offered by Google® of Mountain View, California) or an online shopping account (e.g., Google Checkout™ offered by Google®).

The user account module 208 collects application information from the user 125n, stores this information in the user database 114 and generates a monetization account for the user 125n. For example, the user account module 208 receives an application form and an agreement to terms and conditions from the user 125n. In one embodiment, the user account module 208 generates a monetization account for the user 125n to provide one or more of the following services: enabling an ad placed on a video; tracking ad impressions; tracking clicks on ad impressions; determining a portion of revenue generated from clicks on ads for an owner of a video; and transferring money to an owner of a video (e.g., transferring money to a bank account owned by the owner of the video). The user account module 208 stores the monetization account in the user database 114 accessible via signal line 242.

In another embodiment, the user account module 208 receives a request from a user 125n to activate a monetization account. The user account module 208 instructs the GUI module 126 to generate graphical data for depicting a tutorial to display to the user 125n. The tutorial describes, for example, how to use a website to set up a monetization account and/or how to activate a monetization account. The user account module 208 also instructs the GUI module 126 to generate graphical data for displaying terms and agreements and one or more monetization options to the user 125n.

A monetization option is an option to set up a monetization account for a user 125n. For example, a monetization option is one of creating a new ad serving account (e.g., a Google AdSense™ account), associating an existing ad serving account and/or associating an existing online shopping account (e.g., Google Checkout™ account).

The user account module 208 receives an input for a monetization option from the user 125n. If the input is creating a new ad serving account, the user account module 208 creates an ad serving account for the user 125n and activates the ad serving account for revenue sharing. If the input is associating an existing account such as an ad serving account or an online shopping account, the user account module 208 prompts the user 125n to input information about the existing account, associates the existing account with the revenue sharing program and activates the existing account for revenue sharing. In one embodiment, the user account module 208 stores the activated ad serving account or online shopping account in the user database 114.

The video claim module 210 is software including routines for collecting claim information for a video from a user 125n. In one embodiment, the video claim module 210 is a set of instructions executable by the processor 235 to provide the functionality described below for collecting claim information from a user 125n. In another embodiment, the video claim module 210 is stored in the video database 116 and is accessible and executable by the processor 235. In either embodiment, the video claim module 210 is adapted for cooperation and communication with the processor 235 and other components of the asset hosting site 100 via signal line 228.

The claim information is any information describing the video. For example, the claim information includes one or more of a title, a short description of the video, keywords for the video and other information that is used by the membership module 204 to determine whether the video is eligible for the revenue sharing program. For another example, the claim information includes information used by the eligibility module 178 to determine that a user 125n who has uploaded a video is the owner of the video. In one embodiment, the claim information includes an e-mail address, instant messaging contact and/or telephone number used for contacting the user 125n in the event that the video is placed on hold. Held videos are described in more detail below with reference to FIG. 3.

In one embodiment, the video claim module 210 instructs the GUI module 126 to generate graphical data for presenting a user interface to the user so that the user inputs the claim information about the video via the user interface. The video claim module 210 collects the claim information from the user interface and sends the claim information to the membership module 204. In one embodiment, the video claim module 210 stores the claim information in the video database 116.

The GUI module 126, user database 114, user activity storage 192 and video database 116 are described above with reference to FIG. 1, so that description will not be repeated here. The GUI module 126 is communicatively coupled to the bus 220 via signal line 240. The user database 114 is communicatively coupled to the bus 220 via signal line 242. The user activity storage 192 is communicatively coupled to the bus 220 via signal line 246. The video database 116 is communicatively coupled to the bus 220 via signal line 248.

Membership Module

Figure 3:
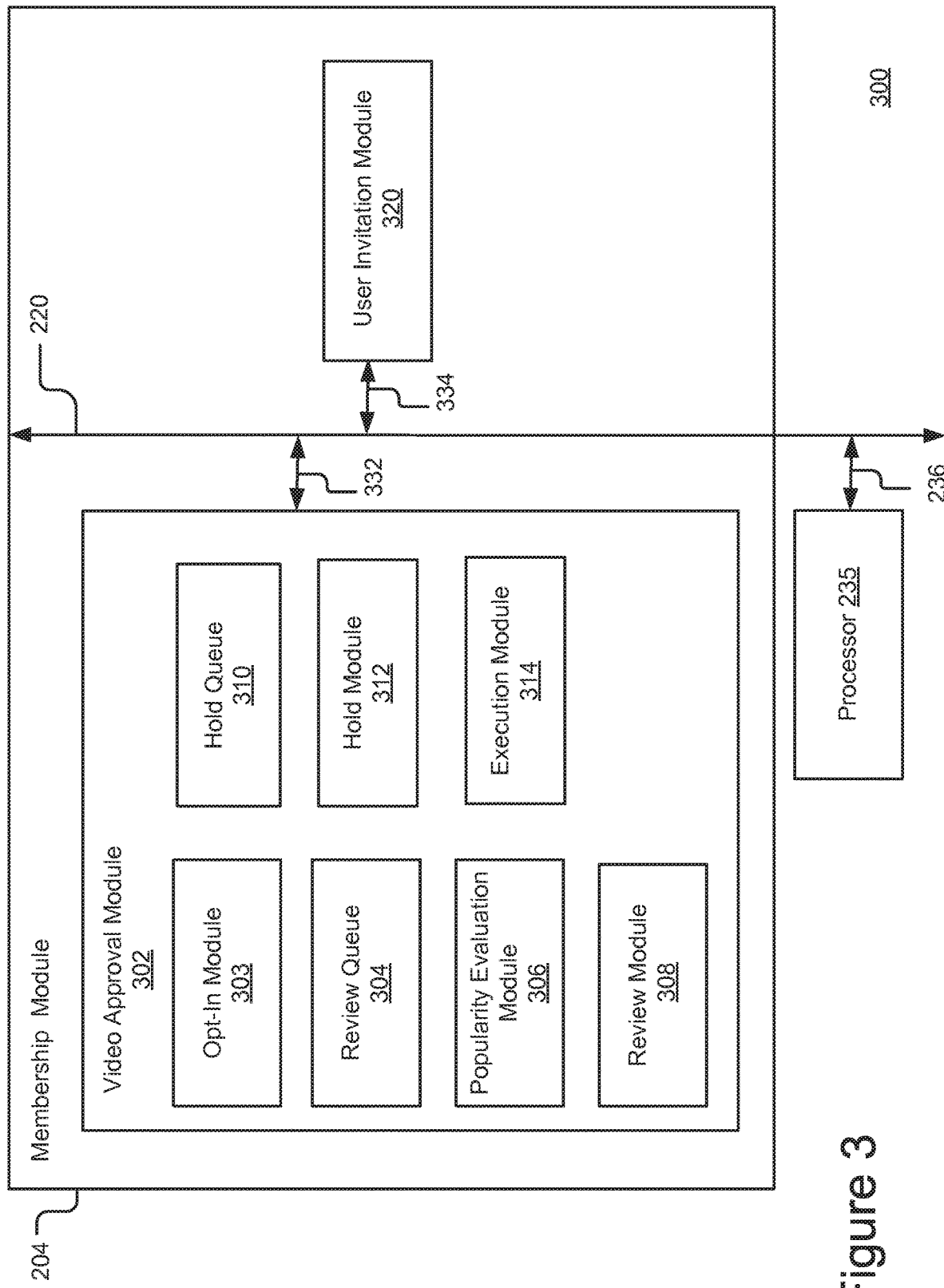
FIG. 3 is a block diagram illustrating one embodiment of a membership module.

Referring now to FIG. 3, one embodiment of the membership module 204 is shown in more detail. FIG. 3 is a block diagram 300 of one embodiment of the membership module 204 that includes a video approval module 302 and a user invitation module 320. This embodiment of the membership module 204 is discussed in conjunction with FIG. 2. For example, FIG. 3 depicts the bus 220, processor 235 and signal line 236 previously described with reference to FIG. 2, so the description of these elements will not be repeated here. The video approval module 302 is communicatively coupled to the bus 220 via signal line 332. The user invitation module 320 is communicatively coupled to the bus 220 via signal line 334. The elements of the video approval module 302 and the user invitation module 320 communicate with the other components of the asset hosting site 100 via the bus 220.

The video approval module 302 is code and routines that, when executed by the processor 235, determines whether a video is eligible to participate in the revenue sharing program. In the depicted embodiment, the video approval module 302 comprises an opt-in module 303, a review queue 304, a popularity evaluation module 306, a review module 308, a hold queue 310, a hold module 312 and an execution module 314. The components of the video approval module 302 are communicatively coupled to each other.

The opt-in module 303 is code and routines for receiving and processing a video opt-in request from a user 125n. A video opt-in request is an input from a user 125n requesting to participate in the revenue sharing program. In one embodiment, the opt-in module 303 receives the video opt-in request from a user 125n and determines whether the user 125n is a new user that has not previously requested to participate in the revenue sharing program. For example, the opt-in module 303 retrieves user profile information from the user database 114, compares the information provided by the user 125n to the information stored in the user profile information and determines whether the user 125n is a new user based at least in part on this comparison. If the user 125n is a new user, the opt-in module 303 sends the request to the user account module 208 and instructs the user account module 208 to create a monetization account for the user 125n. In one embodiment, the opt-in module 303 stores the video opt-in request in the user database 114 and the video in the video database 116. In another embodiment, the opt-in module 303 stores the video that has a video opt-in request in the review queue 304 for further review by the review module 308.

The review queue 304 is a non-transitory computer-readable storage medium. For example, the review queue 304 is a table stored in the memory 237. In one embodiment, the review queue 304 is one of a list, a database or other data organization system stored on the memory 237. The review queue 304 stores one or more video IDs identifying videos that have not been reviewed for eligibility. For example, the review queue 304 includes a list of video IDs that identify a video stored in the video database 116 that need to be reviewed for eligibility to participate in the revenue sharing program. A video ID in the review queue 304 represents a request to review a video identified by the video ID for eligibility to participate in the revenue sharing program. In one embodiment, the review queue 304 also stores a set of claim information associated with video IDs stored in the review queue 304. In one embodiment, the set of claim information is stored in the review queue 304 by the video claim module 210. In another embodiment, historical data describing the videos identified by the video IDs is also stored in the review queue 304.

In one embodiment, the videos in the review queue 304 are prioritized. For example, the videos are prioritized based on the times when the videos were received by the review queue 304. Videos received earlier in time are given priority over videos received later in time. In one embodiment, the videos in the review queue 304 are prioritized based at least in part on one or more of the claim information of the videos and historical data such as popularity and profitability of videos submitted by the users 125n in the past.

The popularity evaluation module 306 is code and routines for evaluating popularity of a video. For example, the popularity evaluation module 306 evaluates each video in the review queue 304 and generates a popularity score for each video. A popularity score represents current popularity and/or a prediction of the future popularity of a video. For example, assume a first video is accessible on 1,000 third party sites 186 and is receiving 500 views per hour, whereas a second video is only accessible on one third party site 186 and is receiving three views per hour. The popularity evaluation module 306 assigns a higher popularity score to the first video since it is accessible on more sites and is receiving more views. The popularity evaluation module 306 stores the popularity score in a memory associated with the asset hosting site 100 such as the video database 116. In one embodiment, the popularity evaluation module 306 sends the popularity score to the review module 308.

In one embodiment, the popularity evaluation module 306 generates a popularity score for a video based at least in part on the popularity data associated with the video. For example, the popularity evaluation module 306 generates a model to predict popularity of a video based on popularity data describing videos that are known to be viral (popularity data includes, for example, reference data, viewership data, favorite counts, ratings, comments, liked counts, disliked counts and sharing counts, etc.). In one embodiment, the model is data describing a trend line that tracks the user activity for the video across a period of time before the video was viral and a period of time after the video was viral. In another embodiment, the model is generated by the popularity evaluation module 306 based at least in part inputs received from an administrator of the asset hosting site 100.

The popularity evaluation module 306 stores the model in a memory such as the user activity storage 192 or the video database 116. The popularity evaluation module 306 retrieves the model and popularity data for a video identified by the review queue 304. The popularity evaluation module 306 compares the retrieved popularity data against the model and generates a popularity score based on this comparison. The popularity evaluation module 306 sends the popularity score to the review module 308. In one embodiment, the popularity evaluation module 306 stores the popularity score in the video database 116.

The review module 308 is code and routines for reviewing a video to determine whether the video is eligible to participate in the revenue sharing program. For example, the review module 308 determines whether the video is eligible to participate in the revenue sharing program based at least in part on the popularity score for the video and/or the popularity data for the video.

In one embodiment, the review module 308 reviews the videos in the review queue 304 for eligibility based at least in part on the popularity scores received from the popularity evaluation module 306 or the popularity data for the video. For example, the review module 308 only reviews videos with popularity scores higher than a predetermined value specified by an administrator of the asset hosting site 100.

In another embodiment, the review module 308 reviews the videos for eligibility based at least in part on the claim information of the videos. For example, the review module 308 reviews a video to determine whether the video includes content that the publisher does not want published. The claim information is retrieved from the review queue 304 or the video database 116. In yet another embodiment, the review module 308 reviews the videos for eligibility based at least in part on the popularity scores, the claim information and the historical data described with reference to FIG. 1 (e.g., the historical popularity or profitability of videos submitted by the user 125n). For example, the historical data storage 196 stores historical data describing the past popularity and profitability of videos submitted by a user 125n and the review module 308 determines whether a video is eligible for the revenue sharing program based in part on this historical data.

In one embodiment, the review module 308 determines whether a video is eligible for the revenue sharing program based on one or more of the popularity score for the video, the claim information for the video, the historical data for the user 125n that owns the video and an input provided by an administrator of the asset hosting site 100.

The review module 308 determines whether a video is eligible for the revenue sharing program after reviewing the video. In one embodiment, the review module 308 sends a review decision to the execution module 314. A review decision is a decision describing whether a video is eligible for the revenue sharing program. For example, a review decision is a decision approving a video for eligibility, rejecting a video as being not eligible or closing review of the video. In one embodiment, the review module 308 stores the review decision in a memory such as memory 237 and deletes the video (or the video ID) from the review queue 304.

In one embodiment, if a review decision is not generated for the video based on the available information (e.g., the popularity score, the claim information, the historical data, etc), the review module 308 stores the video (or a video ID for the video) in the hold queue 310 and deletes the video (or the video ID) from the review queue 304. For example, the review module 308 determines that additional information is required from the user 125n that submitted the video to determine whether the video is eligible for the revenue sharing program. The review module 308 stores the video ID in the hold queue 312 and communicates this event to the hold module 312.

The hold queue 310 is a non-transitory computer-readable storage medium. For example, the hold queue 310 is a table stored in the memory 237. In one embodiment, the hold queue 310 is one of a list, a database or other data organization system stored on the memory 237. The hold queue 310 includes one or more video IDs identifying videos on hold. In one embodiment, the video IDs in the hold queue 310 are prioritized using one or more methods similar to those described above with reference to the review queue 304.

The hold module 312 is code and routines for processing videos on hold. In one embodiment, the hold module 312 checks whether videos are expired and removes expired videos from the hold queue 310. For example, the hold module 312 processes videos in the hold queue 310 and removes any expired videos from the queue. An expired video is a video held in the hold queue 310 over a predetermined time period (e.g., 30 days). The hold module 312 retrieves a video from the hold queue 310 and sends an inquiry to a user 125n (e.g., an owner of the video) that submits the video. For example, the hold module 312 sends an e-mail to an email address owned by the user 125n including questions for which the user 125n is prompted to provide input data to clarify issues that caused the hold status of the video. In one embodiment, the hold module 312 sends inquires to the user 125n via other forms of communication instead of sending an e-mail. For example, the hold module 312 communicates with the user 125n using an instant message or any other form of electronic communication.

The hold module 312 receives a response from the user 125n. In one embodiment, the response includes answers to the questions in the inquiry. The response is in a form of a reply e-mail, a user's input to questions in a website and/or other electronic forms of communication. For example, the hold module 312 sends and e-mail to the user 125n that includes a link to an electronic form used by the user 125n to provide additional information to the hold module 312. The responses may also be received in an instant message, in the body of an e-mail or as an attachment to an e-mail from the user 125n. The hold module 312 stores the response in the user database 114. The hold module 312 sends the video along with the response to the review module 308 for a second review and deletes the video from the hold queue 310. In one embodiment, if no response is received from the user 125n after a predetermined time period (e.g., 30 days), the hold module 312 sends a second inquiry to the user 125n.

The execution module 314 is code and routines for executing a review decision. In one embodiment, the execution module 314 receives a review decision for a video from the review module 308 and executes instructions included in the review decision. If the review decision approves the video for the revenue sharing program, the execution module 314 tags the video as an eligible video and takes steps to monetize the video. For example, the execution module 314 associates one or more linear and/or non-linear ads with the video. In one embodiment, the execution module 314 associated the one or more ads to the video after the owner of the video has consented to participate in the revenue sharing program. In another embodiment, the execution module 314 determines whether the user has an active monetization account before associating an ad with the video. The execution module 314 stores the video and the ad in a memory such as the video database 116. If the review decision is closing review of the video, the execution module 314 closes the claim information for the video and does not associate any ads with the video. In this case, the video is still available for viewing but is not eligible to participate in the revenue sharing program. If the review decision is rejecting the video, the execution module 314 deletes the video from the video database 116 and the video is not available for viewing any more.

The user invitation module 320 is code and routines for sending a message to an eligible user inviting them to participate in the revenue sharing program. An eligible user is a user 125n that is eligible to participate in the revenue sharing program. For example, the user invitation module 320 determines that a user 125n is eligible to participate in the revenue sharing program and sends an e-mail to the user 125n that invites the user 125n to sign up for the revenue sharing program. In one embodiment, an eligible user is a user that owns an eligible video to participate in the revenue sharing program.

Methods

FIGS. 4-7C depict various methods 400, 500, 600, 700 performed by the system described above with reference to FIGS. 1-3.

Figure 4:
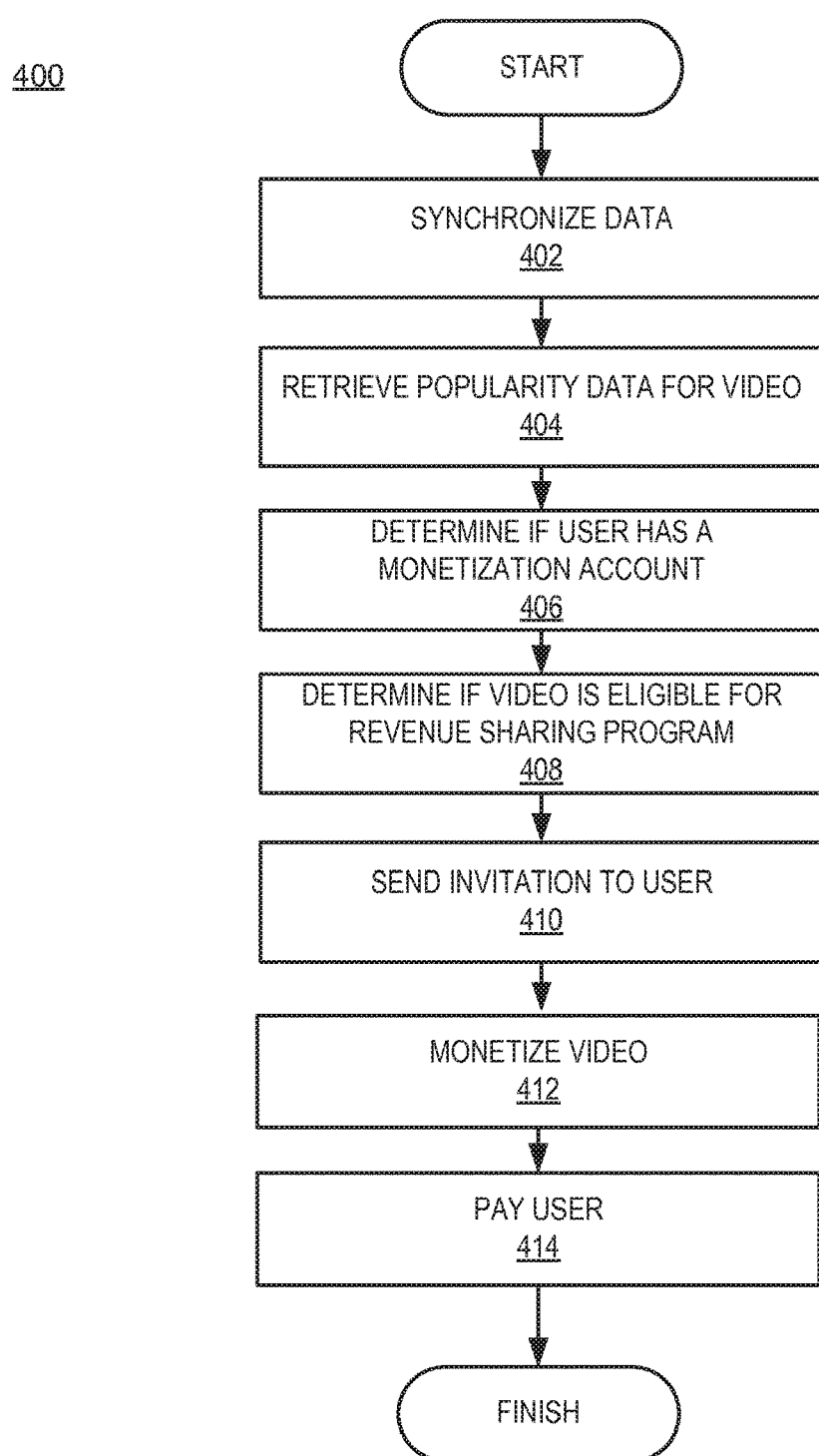
FIG. 4 is a block diagram illustrating one embodiment of a method for monetizing a video and sharing revenue with an owner of a video.

FIG. 4 is a flow diagram depicting one embodiment of a method 400 for monetizing a video and sharing revenue with a user 125n that owns the video. The communication module 195 and the synchronization module 110 communicate with one another to synchronize 402 the popularity data stored on the first storage device 141 with the popularity data stored on the user activity storage 192 so that the popularity data stored on the user activity storage 192 is up to date. The eligibility module 178 retrieves 404 popularity data for a video. In one embodiment, the video is a video that the monitor module 191 and/or the eligibility module 178 has indicated as trending towards becoming viral. For example, the monitor module 191 or the eligibility module 178 determine that a video is trending towards becoming viral based at least in part on the most recent popularity data synchronized between the first storage device 141 and the user activity storage 192.

At step 406, the eligibility module 178 determines if the user 125n that uploaded the video identified in step 404 has a monetization account (e.g., a Google Checkout™ account or a Google AdSense™ account). If not, the eligibility module 178 takes steps to present the user 125n with a GUI that includes information usable by the user 125n to set up a monetization account.

At step 408, the eligibility module 178 determines if the video is eligible for participation in the revenue sharing program. For example, the eligibility module 178 takes steps to present the user 125n with a GUI usable by the user 125n to provide information describing the video that is used to determine whether the video is eligible for the revenue sharing program. For example, the user 125n must own the video or an appropriate license to the video in order for the video to be eligible for the revenue sharing program.

At step 410, the eligibility module 178 sends an invitation to the user to apply to participate in the revenue sharing program. In one embodiment, the invitation includes an invitation to activate a monetization account (e.g., a Google Checkout account or a Google AdSense™ account). A person having ordinary skill in the art will recognize that step 410 can occur at a different point in the method 400. For example, step 410 occurs after step 404 and before step 406.

At step 412, the eligibility module 178 monetizes the video with advertisements. The payment system 190 keeps track of revenue generated from the video and pays the 414 the user 125n.

Figure 5:
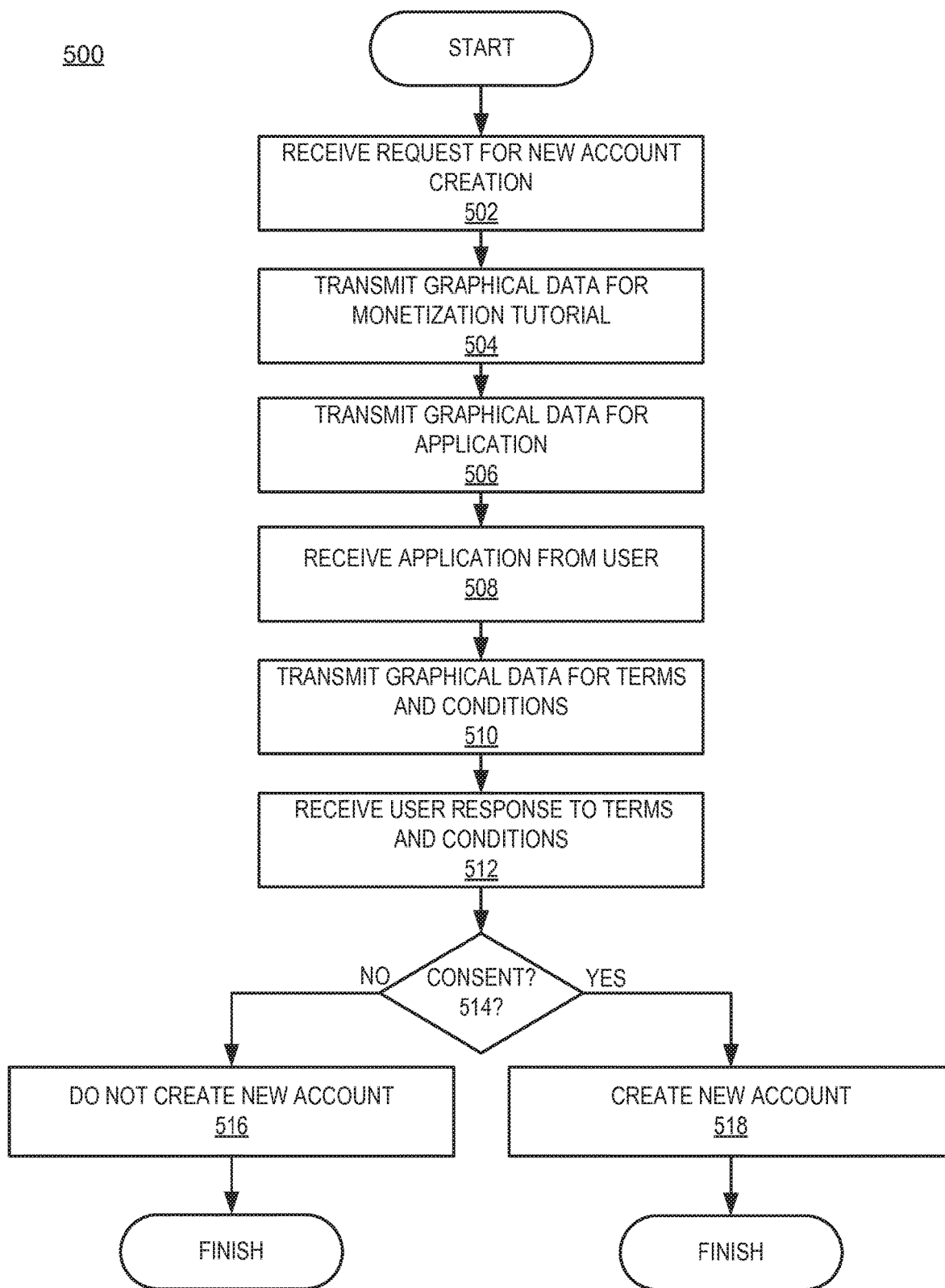
FIG. 5 is a flow diagram of one embodiment of a method for creating a monetization account.

FIG. 5 is a flow diagram depicting one embodiment of a method 500 for creating a monetization account. A monetization account includes one or more of an online shopping account (e.g., a Google Checkout™ account) or an ad serving account (e.g., a Google AdSense™ account). The communication interface 202 receives 502 a request to create monetization account from a client device 115n. The communication interface 202 delivers the request to the user account module 208.

At step 504, the user account module 208 instructs the GUI module 126 to generate graphical data for providing one or more user interfaces for depicting a monetization tutorial. The monetization tutorial includes, for example, a description of the monetization account and instructions describing how to create a monetization account. In one embodiment, the GUI module 126 retrieves the graphical data for the user interface from the graphical data storage 194. The GUI module 126 communicates with the front end interface 102 to transmit 504 the graphical data to the client device 115n. A monitor or display associated with the client device 115n displays the tutorial.

At step 506, the user account module 208 instructs the GUI module 126 to generate graphical data for providing one or more user interfaces for depicting an application form. In one embodiment, the GUI module 126 retrieves the graphical data for the application form from the graphical data storage 194. The GUI module 126 communicates with the front end interface 102 to transmit 506 the graphical data to the client device 115n. A monitor or display associated with the client device 115n displays the application form. The application form includes fields to be completed by the user 125n. The user 125n provides inputs for completing the application and submitting the inputs to the user account module 208. The front end interface 102 receives 508 the inputs via the network 105. The user account module 208 communicates with the front end interface 102 to receive the inputs. In one embodiment, the user account module 208 stores the inputs in non-transitory memory such as the user database 114.

At step 510, the user account module 208 instructs the GUI module 126 to generate graphical data for providing one or more user interfaces for depicting the terms and conditions for the monetization account. In one embodiment, the GUI module 126 retrieves the graphical data for the terms and conditions from the graphical data storage 194. The GUI module 126 communicates with the front end interface 102 to transmit 510 the graphical data to the client device 115n. A monitor or display associated with the client device 115n displays the one or more user interfaces including the terms and conditions. The user interface for the terms and conditions includes one or more input graphics (e.g., a graphical consent button, a graphical decline button, a checkbox and submit button, etc.) for the user 125n to either provide consent to the terms and conditions, or decline to consent to the terms and conditions. The user 125n provides one or more inputs indicating whether they consent to the terms and conditions, and submits this response to the user account module 208 using the input graphics. The front end interface 102 receives 512 the user response to the terms and conditions via the network 105. The user account module 208 communicates with the front end interface 102 to receive the user response.

At step 514, the user account module 208 analyzes the user response to determine whether the user 125n has consented to the terms and conditions. If not, the method 500 moves to step 516 and the user account module 208 does not create a new account. If yes, the method 500 moves to step 518 and the user account module 208 creates a new account for the user 125n based at least in part on the information provided by the user 125n in the application. In one embodiment, data describing the new account is stored in a non-transitory memory such as the user database 114.

Figure 6A:
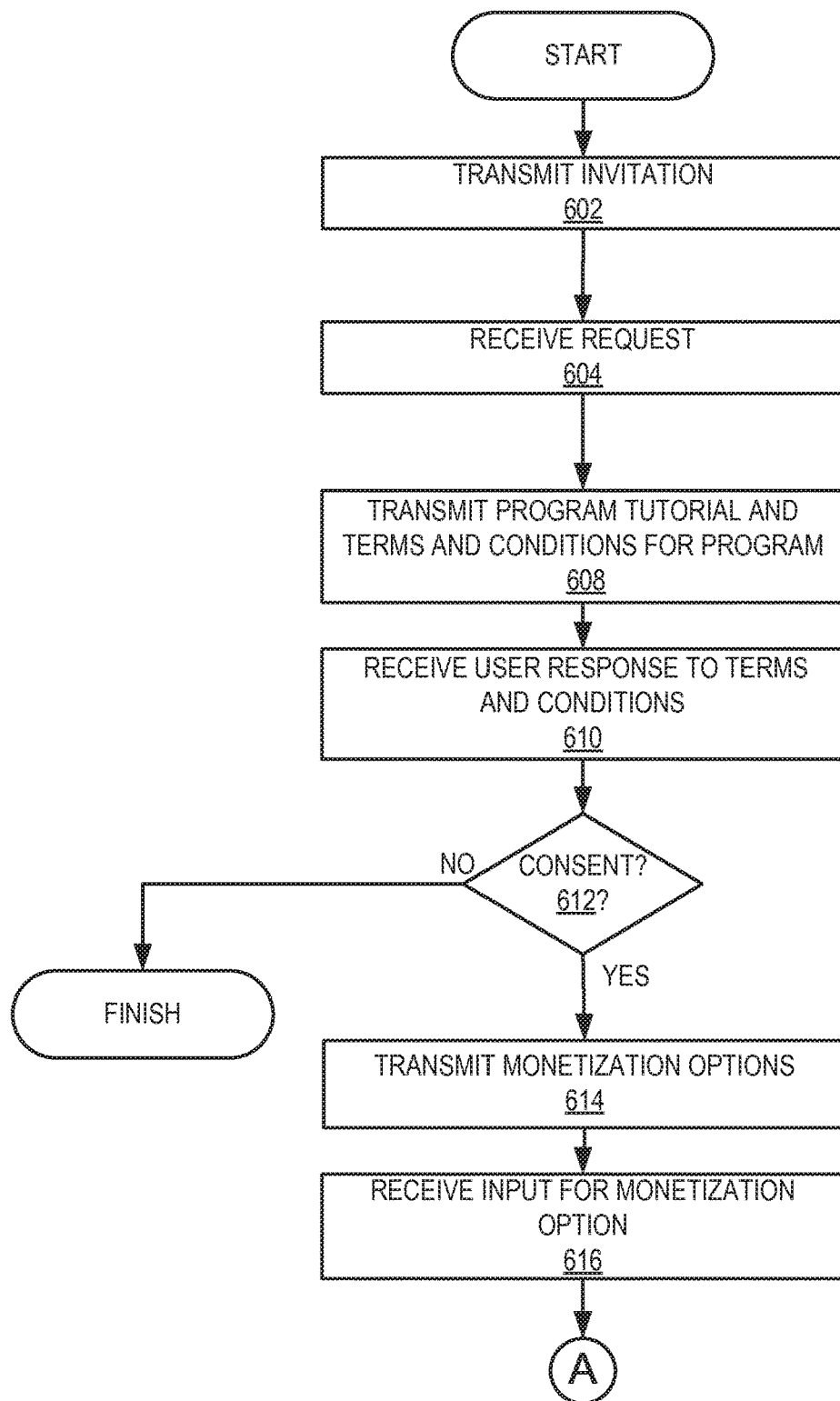
FIGS. 6A-6C are flow diagrams of one embodiment of a method for activating a monetization account.
Figure 6B:
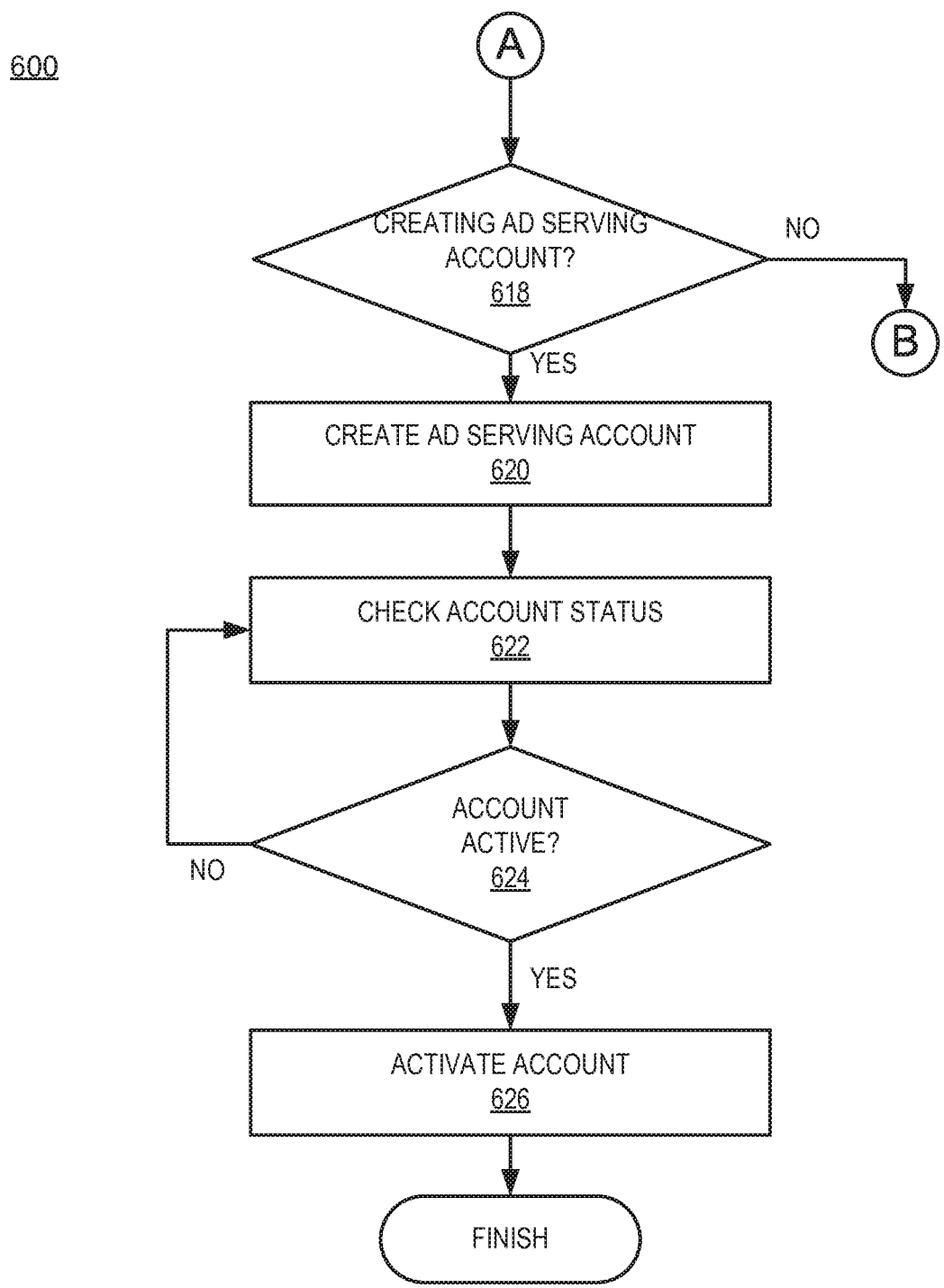
Figure 6C:
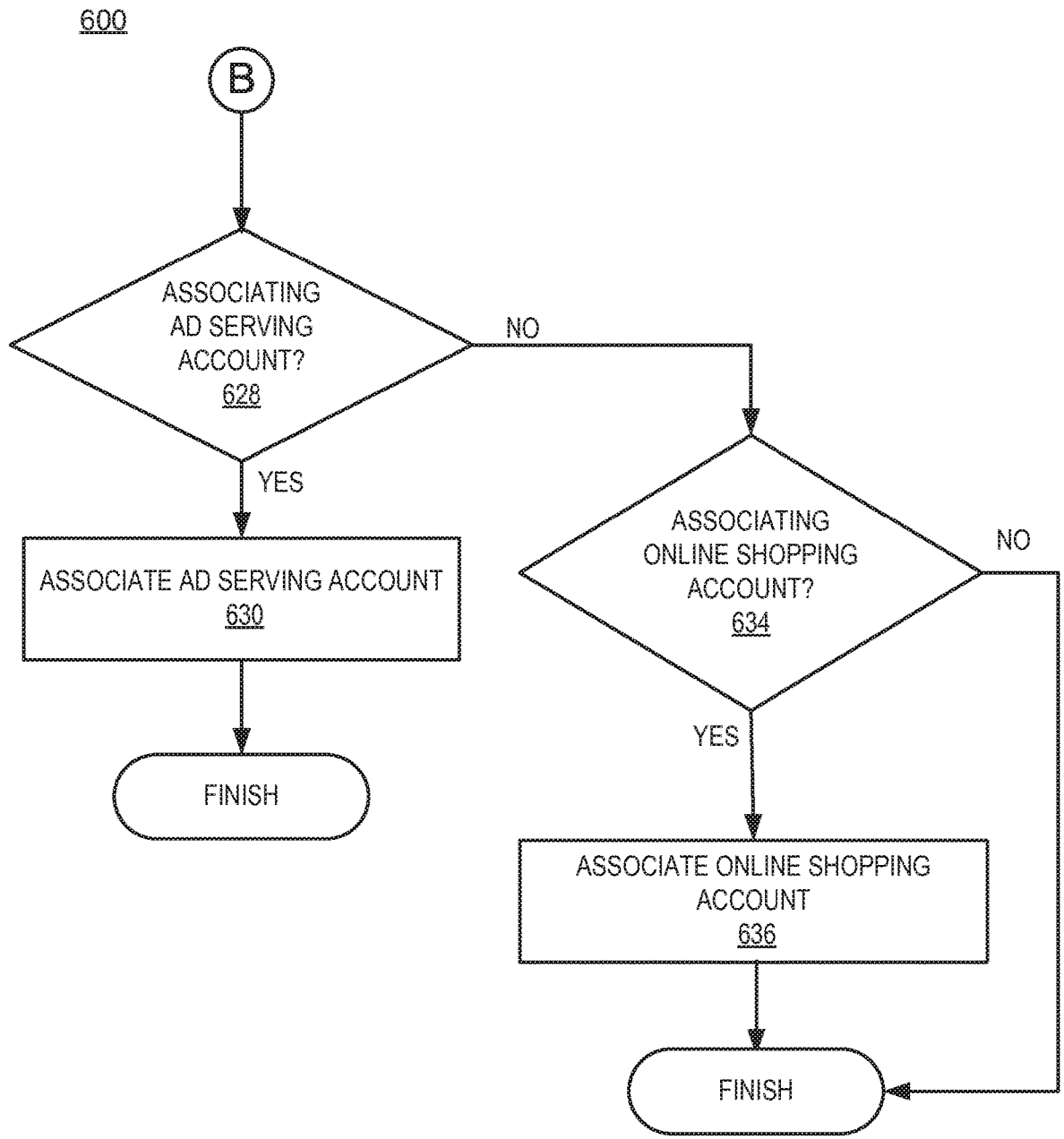

FIGS. 6A-6C are flow diagrams depicting one embodiment of a method 600 for activating a monetization account. Now referring to FIG. 6A, at step 602 the user invitation module 320 retrieves contact information for the user 125n (e.g., and e-mail address, instant messaging contact, etc.) from the user database 114. The user invitation module 320 transmits 602 an invitation communication (e.g., e-mail, instant message, etc.) to the user 125n using the contact information. The invitation communication includes an invitation to participate in the revenue sharing program and activate a monetization account (e.g., a Google Checkout™ account or a Google AdSense™ account). The invitation communication also includes a graphical input (e.g., a link, a graphical button, etc.) that the user 125n can click to transmit a user request to the asset hosting site 100. The user request is a request from the user 125n to the asset hosting site 100 to activate the monetization account described above with reference to method 500.

The front end interface 102 receives 604 the user request to activate the monetization account and communicates with the user account module 208 to transmit the request to the user account module 208. The method 600 proceeds to step 608 if the request is received. If the request is not received, the method 600 ends at step 604.

At step 608, the user account module 208 receives the request and communicates with the GUI module 126 to cause the GUI module 126 to generate graphical data for depicting one or more user interfaces including a tutorial and the terms and conditions for participating in the revenue sharing program. The tutorial describes the revenue sharing program and what steps need to be taken to receive revenue payments. In one embodiment, the tutorial describes how to activate the monetization account and/or link an existing monetization account with the user's 125n participation in the revenue sharing program. The terms and conditions describe the legal requirements that the user 125n must consent to in order to participate in the revenue sharing program. In one embodiment, the terms and conditions describe the legal requirements that the user 125n must consent to in order to activate the monetization account. In one embodiment, the GUI module 126 retrieves the graphical data for the tutorial and the terms and conditions from the graphical data storage 194. The GUI module 126 communicates with the front end interface 102 to transmit 608 the graphical data to the client device 115n. A monitor or display associated with the client device 115n displays the one or more user interfaces including the tutorial and the terms and conditions. The user interface for the terms and conditions includes one or more input graphics (e.g., a graphical consent button, a graphical decline button, a checkbox and submit button, etc.) for the user 125n to either provide consent to the terms and conditions of the revenue sharing program, or decline to consent to the terms and conditions. The user 125n provides one or more inputs indicating whether he or she consents to the terms and conditions, and submits this response to the user account module 208 using the input graphics.

At step 610, the front end interface 102 receives the user response to the terms and conditions via the network 105. The user account module 208 communicates with the front end interface 102 to receive the user response. At step 612, the user account module 208 analyzes the user response to determine if the user 125n has indicated their consent to the terms and conditions. If the user account module 208 determines 612 that consent has not been provided, the method 600 ends. If the user account module 208 determines 612 that consent has been provided, the method 600 moves to step 614.

At step 614, the user account module 208 communicates with the GUI module 126 to cause the GUI module 126 to generate graphical data for providing one or more user interfaces depicting one or more monetization options that the user 125n can select from. The monetization options include one or more of (1) creating a new ad serving account (e.g., a Google AdSense™ account) that is associated with the user's participation in the revenue sharing program and used to transmit revenue to the user 125n, (2) associating an existing ad serving account with the monetization of a video that is approved for participating in the revenue sharing program and then using this existing ad serving account to transmit revenue to the user 125n, (3) creating a new online shopping account (e.g., Google Checkout account) that is associated with the user's participation in the revenue sharing program and used to transmit revenue to the user 125n, and (4) associating an existing online shopping account (e.g., Google Checkout account) with the monetization of a video that is approved for participating in the revenue sharing program and then using this existing online shopping account to transmit revenue to the user 125n. The user interfaces also include one or more input graphics that the user 125n can select to identity which of the monetization options the user 125n has selected.

In one embodiment, the GUI module 126 retrieves the graphical data for the monetization options user interface from the graphical data storage 194. The GUI module 126 communicates with the front end interface 102 to transmit 614 the graphical data to the client device 115n. A monitor or display associated with the client device 115n displays the user interfaces including the monetization options. The user 125n provides one or more inputs indicating which monetization option they have selected, and submits this response to the user account module 208 using the input graphics included in the user interfaces.

At step 616, the front end interface 102 receives the user response indicating the selected monetization option via the network 105. The user account module 208 communicates with the front end interface 102 to receive the user response.

Referring to FIG. 6B, at step 618 the user account module 208 analyzes the user response to determine if the user 125n has elected to create an ad serving account. The method 600 moves to step 628 depicted on FIG. 6C if the user account module 208 determines that the user 125n has not elected to create an ad serving account. If yes, the method 600 moves to step 620.

At step 620, the user account module 208 creates an ad serving account for the user. In one embodiment, the user account module 208 performs steps similar to steps 504-514 and 518 described above with reference to FIG. 5 to create an ad serving account.

At step 622, the user account module 208 checks the status of creating the ad serving account. For example, the user account module 208 determines 624 whether the ad serving account is active. If the account is not active, the method 600 moves to step 622. If the account is active, the method 600 moves to step 626.

At step 626, the user account module 208 activates the ad serving account. For example, the user account module 208 links the account to the user's 125n participation in the revenue sharing program so that the payment system 190 can send revenue to the user 125n via the ad serving account.

Referring to FIG. 6C, at step 628 the user account module 208 determines 628 whether the input for the selected monetization option is associating an existing ad serving account. If the input is associating an existing ad serving account, the method 600 moves to step 630. If the input is not associating an existing ad serving account, the method 600 moves to step 634.

At step 630, the user account module 208 associates the existing ad serving account with the user's participation in the revenue sharing program so that the payment system 190 can send revenue to the user 125n via the ad serving account. In one embodiment, the user account module 208 prompts the user 125n to input information about the existing ad serving account via a user interface generated using graphical data transmitted to the client device 115n by the GUI module 126 via the front end interface 102 and the network 105.

At step 634, the user account module 208 determines whether the monetization option inputs provided by the user 125n has elected to associate an online shopping account with the user's 125n participation in the revenue sharing program. If no at step 634, the method 600 ends. If yes at step 634, the method 600 moves to step 636.

At step 636, the user account module 208 associates 636 the existing online shopping account with the user's participation in the revenue sharing program so that the payment system 190 can send revenue to the user 125n via the online shopping account. In one embodiment, the user account module 208 prompts the user 125n to input information about the existing online shopping account via a user interface generated using graphical data transmitted to the client device 115n by the GUI module 126 via the front end interface 102 and the network 105.

Figure 7A:
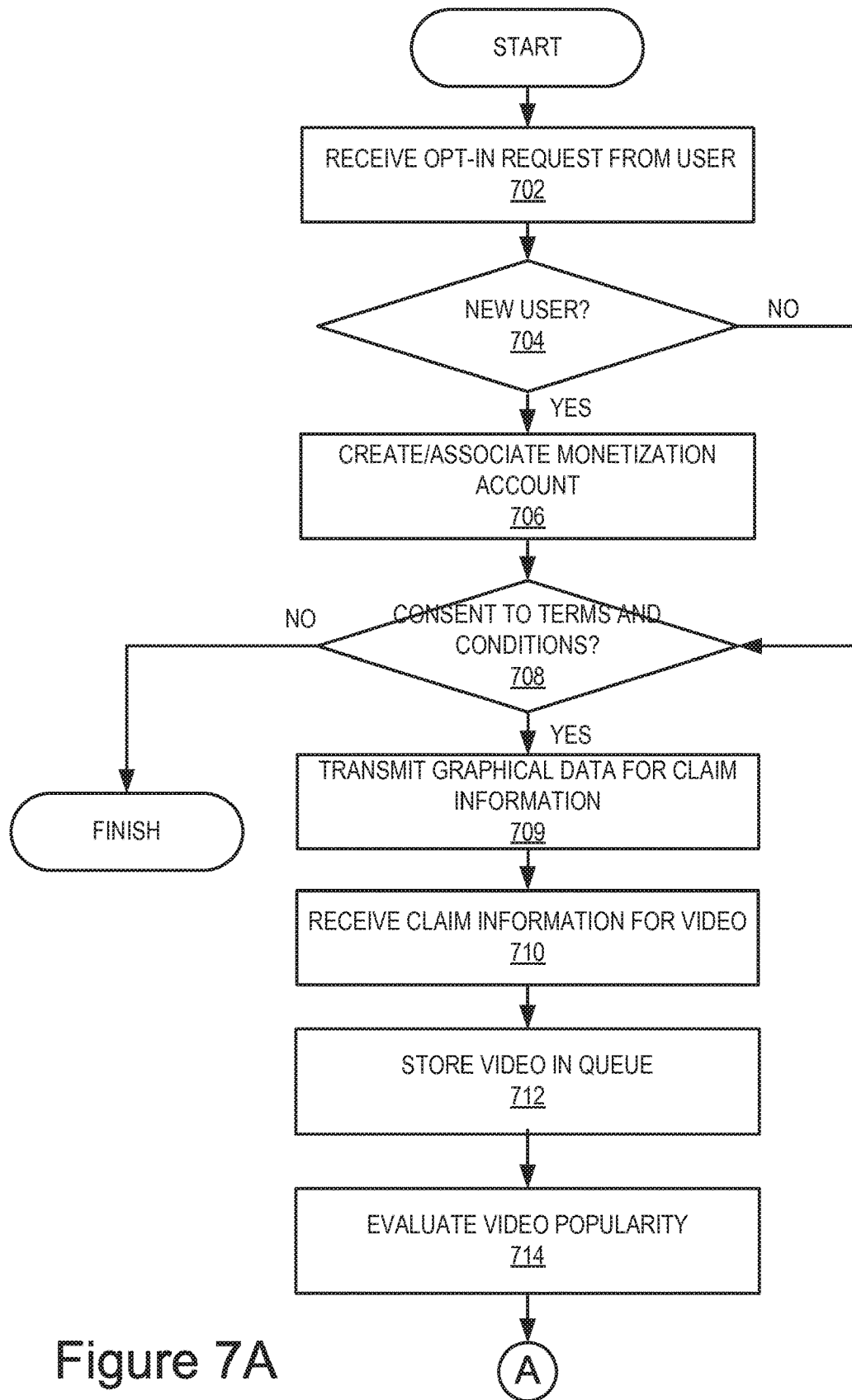
FIGS. 7A-7C are flow diagrams of one embodiment of a method for determining eligibility of a video to participate in a revenue sharing program.
Figure 7B:
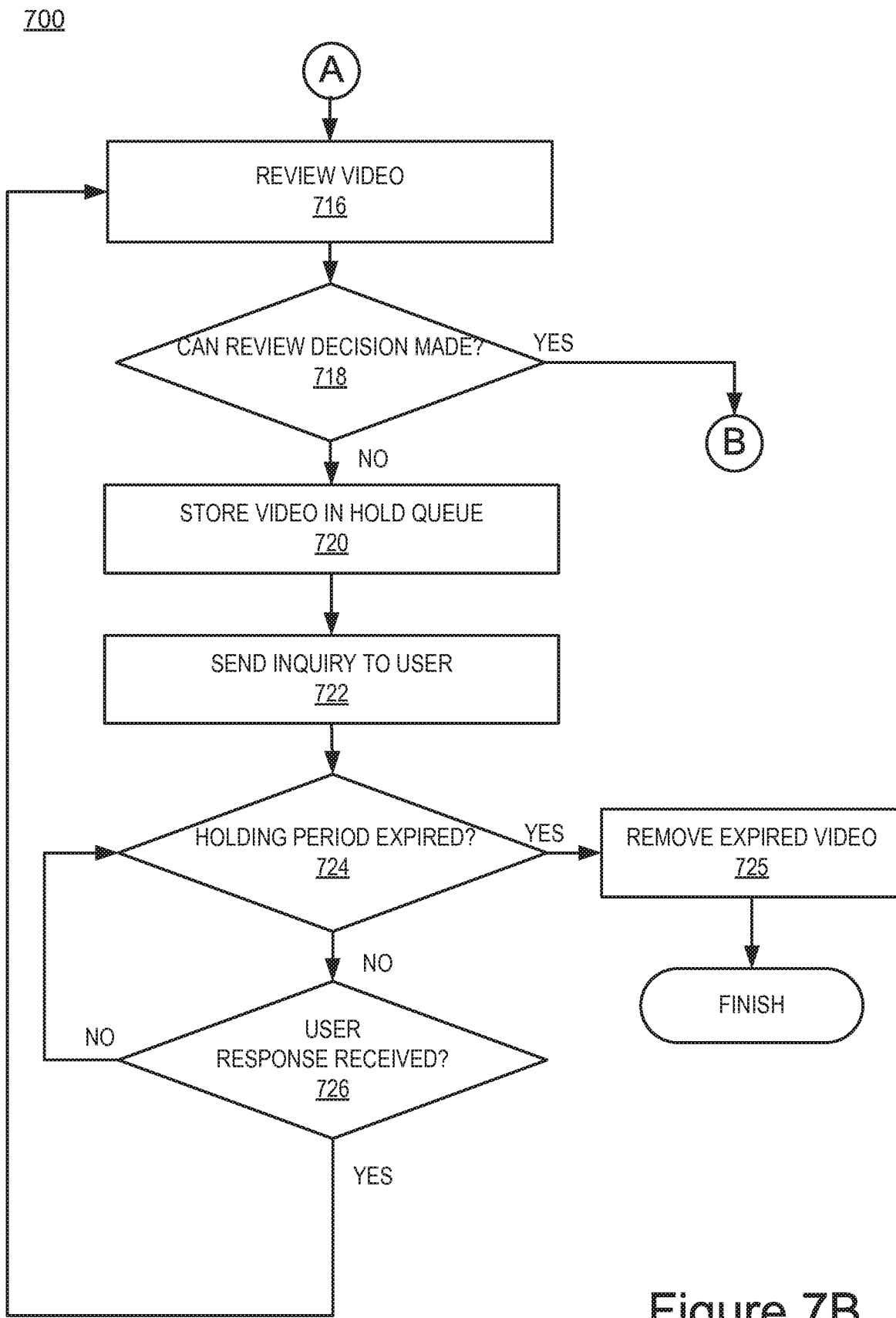
Figure 7C:
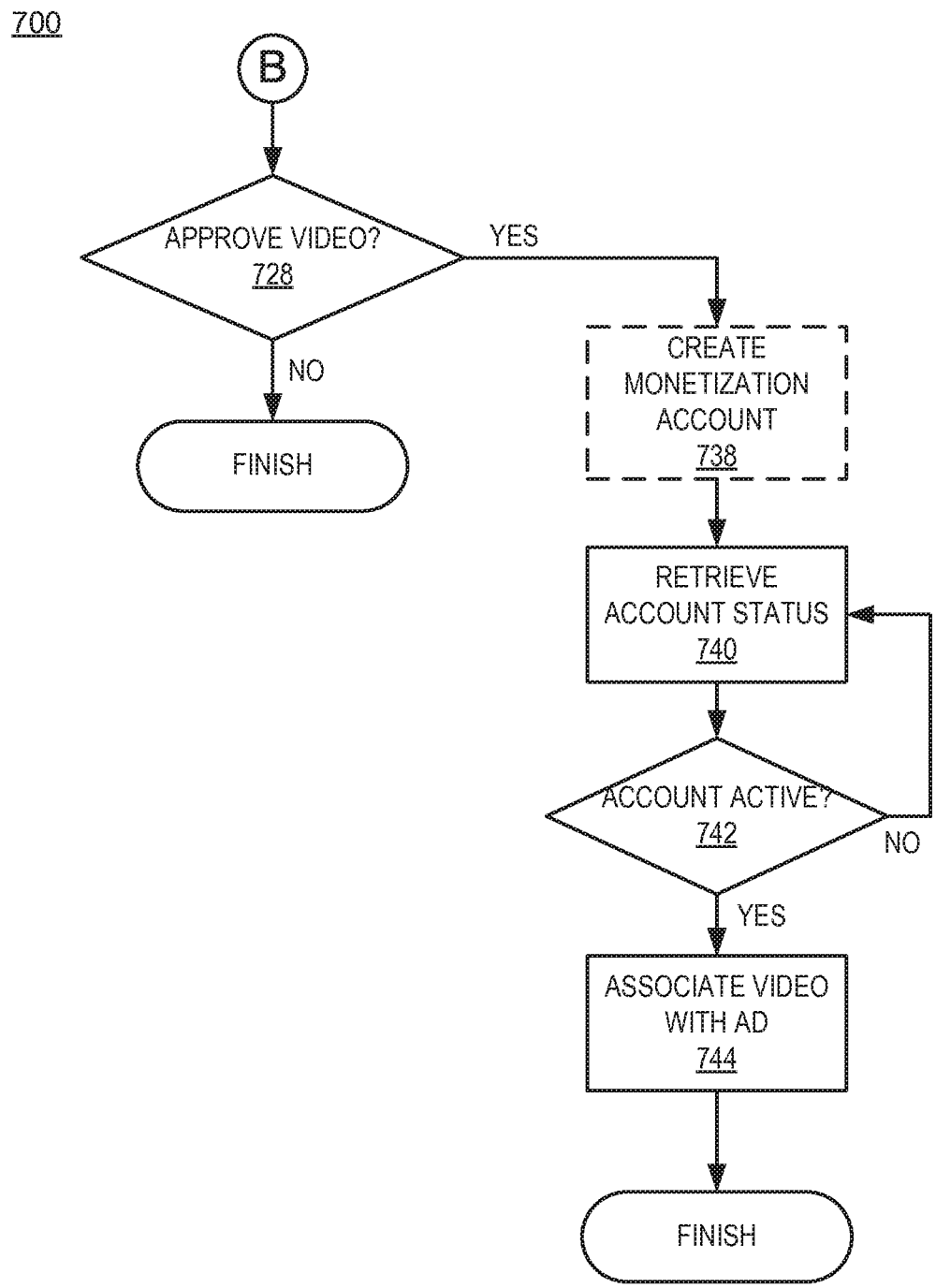

FIGS. 7A-7C are flow diagrams of one embodiment of a method 700 for determining whether a video is eligible to participate in the revenue sharing program. Referring to FIG. 7A, a user 125n uses a client device 115n to send a video opt-in request to the opt-in module 303. The front end interface 102 receives 702 the opt-in request from the client device 115n via the network 105 and communicates with the communication interface 202 to transmit the video opt-in request to the opt-in module 303. The opt-in module 303 receives the opt-in request and determines 704 whether the user 125n is a new user to the revenue sharing program. If the user 125n is new to the program, the method 700 moves to step 706. Otherwise, the method 700 moves to step 708. The opt-in module 303 sends the video opt-in request to the user account module 208.

At step 706, the user account module 208 creates and/or associates a monetization account for the user 125n. In one embodiment, the user account module 208 creates a new monetization account for the user 125n by taking steps similar to steps 504-514 and 518 with reference to FIG. 5. The user account module 208 associates the new account created at step 518 with the user's 125n participation in the revenue sharing program so that the payment system 190 pays the user 125n via the monetization account (e.g., a Google Checkout™ account or a Google AdSense™ account).

In another embodiment, at step 706 the user account module 208 prompts the user 125n to input information about an existing monetization account and associates the existing monetization account to the revenue sharing program.

At step 708, the user account module 208 verifies the user's consent to terms and conditions for the revenue sharing program. Step 708 in FIG. 7A performs functions similar to steps 512, 514, 516 and 518 in FIG. 5 or steps 608, 610 and 612 in FIG. 6A. For example, the user account module 208 communicates with the GUI module 126 to transmit graphical data to the client 115n for displaying a user interface depicting the terms and conditions and an input graphic used by the user 125n to indicate whether he or she consents to the terms and conditions. If at step 708 the user 125n does not consent to the terms and conditions, the method 700 ends. If the user 125n does consent to the terms and conditions, the method 700 moves to step 709. The user account module 208 communicates with the video claim module 210 to indicate the user's agreement to the terms and conditions.

At step 709 the video claim module 210 communicates with the GUI module 126 to transmit graphical data to the client device 115n for displaying a user interface used by the user 125n to input claim information for a video. The user 125n inputs the claim information and submits the form. The front end interface 102 receives 710 the claim information via the network 105. The front end interface 102 communicates with the video claim module 210 to transmit the claim information to the video claim module 210. The video claim module 210 receives the claim information for the video. The video claim module 210 stores 712 the claim information and a video ID for the video in the review queue 304.

At step 714, the popularity evaluation module 306 retrieves the video ID from the review queue 304. The popularity evaluation module 306 evaluates 714 the popularity of the video and determines a popularity score for the video. The popularity evaluation module 306 sends the popularity score to the review module 308. In one embodiment, the popularity evaluation module 306 stores the popularity score in the video database 116.

Referring to FIG. 7B, the review module 308 retrieves the video ID from the review queue 304 and reviews 716 the video for eligibility to participate in the revenue sharing program based at least in part on the popularity score. In one embodiment, an administrator of the video hosting site 100 defines a minimum popularity score for eligibility and the review module 308 determines whether the popularity score for the video meets the minimum popularity score.

At step 718, the review module 308 determines whether a review decision can be made for the video. For example, it may be unclear from the claim information whether the user 125n who uploaded the video is actually the owner of the video. In this case, a decision about whether the video is eligible for participation in the revenue sharing program cannot be made until additional information is received from the user 125n. If at step 718 a review decision can be made, the method 700 moves to step 728 (depicted in FIG. 7C). If a review decision cannot be made, the method 700 moves to step 720.

At step 720, the review module 308 removes the video ID from the review queue 304 and stores the video ID in the hold queue 310. At step 722, the hold module 312 sends 722 an inquiry to the user 125n about the video. For example, the hold module 312 sends an e-mail to the user including questions relating to the issues that prompted the video to be placed on hold.

A holding period is the maximum amount of time that a video will remain in the hold queue 310. For example, the holding period is 30 days. If the user 125n does not provide answers to the questions sent at step 722 after 30 days the video ID is deleted from the hold queue 310 and the user's 125n application to participate in the revenue sharing program is rejected and the method 700 ends. At step 724, the hold module 312 checks to determine 724 whether the holding period has expired. If so, the method 700 moves to step 725. At step 725 the video ID is removed from the hold queue 310 and the user's 125n application is closed. If at step 724 the holding period is not expired, the method 700 moves to step 726.

At step 726, the hold module 312 checks whether a response is received from the user 125n. If a response is received, the method 700 returns to step 716. If a response is not received, the method 700 moves to step 724.

Referring to FIG. 7C, the execution module 314 receives the review decision from the review module 308. The execution module 314 determines 728 whether the review decision received from the review module 308 is to approve the video for participating in the revenue sharing program. If at step 728 the execution module 314 determines that the review decision received from the review module 308 is not to approve the video, the method 700 ends. If the execution module 314 determines the review decision is to approve the video at step 728, the method moves to step 738.

At step 738, the execution module 314 instructs the user account module 208 to create 738 a monetization account for the user 125n. Step 738 is similar to steps 502-514 and 518 described above for FIG. 5 and steps 618-626 described above with reference to FIG. 6B, so that description will not be repeated here. Step 738 is optional in method 700 since the user may already have a monetization account.

At step 740, the user account module 208 retrieves the status of the monetization account. At step 742 the user account module 208 determines whether the monetization account is active. If the account is not active, the method 700 moves back to step 740. If the account is active, the method 700 moves to step 744. At step 744 the user account module 208 sends information about the active account to the execution module 314 and the execution module 314 associates 744 an ad with the video.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustra-

What is claimed is:

1. A method comprising:
receiving a plurality of videos to be hosted at an asset hosting platform and submitted by an owner of the plurality of videos;
providing the plurality of videos for consumption by users of the asset hosting platform;
retrieving historical data associated with one or more of the plurality of videos submitted by the owner, the historical data identifying a historical popularity of one or more of the plurality of videos;
determining whether the historical data associated with the one or more of the plurality of videos satisfies a viewership rate specifying a rate of viewership over a predetermined period of time for the one or more of the plurality of videos;
responsive to determining that the historical data associated with the one or more of the plurality of videos satisfies the viewership rate, determining the owner is eligible to participate in a video performance sharing program; and
generating, by a processor, a communication for a client device associated with the owner of the plurality of videos to invite the owner to participate in the video performance sharing program.

2. The method of claim 1, further comprising:
determining ownership of the plurality of videos, wherein determining that the owner is eligible to participate in the video performance sharing program is further based at least in part on determining that the owner has the ownership of the plurality of videos.

3. The method of claim 1, wherein the communication comprises a graphical input that allows the owner of the plurality of videos to activate features associated with the video performance sharing program.

4. The method of claim 1, further comprising:
monitoring user activity associate with the plurality of videos.

5. The method of claim 4, further comprising:
determining a popularity score corresponding to one or more of the plurality of videos based at least in part on the user activity associated with the plurality of videos, wherein determining that the owner is eligible to participate in the video performance sharing program is further based at least in part on the popularity score.

6. The method of claim 5, further comprising:
determining whether the popularity score corresponding to the one or more of the plurality of videos satisfies a minimum popularity score, wherein determining that the owner is eligible to participate in the video performance sharing program is further based at least in part on determining that the popularity score corresponding to the one or more of the plurality of videos satisfies the minimum popularity score.

7. The method of claim 1, further comprising:
receiving an additional video submitted by the owner of the plurality of videos, the additional video owned by the owner and to be hosted at the asset hosting platform;
associating a secondary content item with the additional video, in response to determining the additional video is eligible to be presented with secondary content; and
providing a reward to the owner of the additional video based at least in part on user accesses of the secondary content item.

8. The method of claim 1, further comprising:
creating a reward account for the owner of the plurality of videos; and
activating the reward account.

9. A non-transitory computer readable medium storing instructions that, in response to execution by a processor, cause the processor to perform operations comprising:
receiving a plurality of videos to be hosted at an asset hosting platform and submitted by an owner of the plurality of videos;
providing the plurality of videos for consumption by users of the asset hosting platform;
retrieving historical data associated with one or more of the plurality of videos submitted by the owner, the historical data identifying a historical popularity of one or more of the plurality of videos;
determining whether the historical data associated with the one or more of the plurality of videos satisfies a viewership rate specifying a rate of viewership over a predetermined period of time for the one or more of the plurality of videos; responsive to determining that the historical data associated with the one or more of the plurality of videos satisfies the viewership rate, determining the owner is eligible to participate in a video performance sharing program; and
generating a communication for a client device associated with the owner of the plurality of videos to invite the owner to participate in the video performance sharing program.

10. The non-transitory computer readable medium of claim 9, the operations further comprising:
determining ownership of the plurality of videos, wherein determining that the owner is eligible to participate in the video performance sharing program is further based at least in part on determining that the owner has the ownership of the plurality of videos.

11. The non-transitory computer readable medium of claim 9, wherein the communication comprises a graphical input that allows the owner of the plurality of videos to activate features associated with the video performance sharing program.

12. The non-transitory computer readable medium of claim 9, the operations further comprising:
monitoring user activity associate with the plurality of videos; and
determining a popularity score corresponding to one or more of the plurality of videos based at least in part on the user activity associated with the plurality of videos, wherein determining that the owner is eligible to participate in the video performance sharing program is further based at least in part on the popularity score.

13. The non-transitory computer readable medium of claim 12, the operations further comprising:
determining whether the popularity score corresponding to the one or more of the plurality of videos satisfies a minimum popularity score, wherein determining that the owner is eligible to participate in the video performance sharing program is further based at least in part on determining that the popularity score corresponding to the one or more of the plurality of videos satisfies the minimum popularity score.

14. The non-transitory computer readable medium of claim 9, the operations further comprising:
receiving an additional video submitted by the owner of the plurality of videos, the additional video owned by the owner and to be hosted at the asset hosting platform;

associating a secondary content item with the additional video, in response to determining the additional video is eligible to be presented with secondary content; and providing a reward to the owner of the additional video based at least in part on user accesses of the secondary content item.

15. The non-transitory computer readable medium of claim 9, the operations further comprising:

creating a reward account for the owner of the plurality of videos; and activating the reward account.

16. A system comprising:

a memory; and a processor, coupled to the memory, the processor configured to:

receive a plurality of videos to be hosted at an asset hosting platform and submitted by an owner of the plurality of videos;

provide the plurality of videos for consumption by users of the asset hosting platform;

retrieve historical data associated with one or more of the plurality of videos submitted by the owner, the historical data identifying a historical popularity of one or more of the plurality of videos;

determine whether the historical data associated with the one or more of the plurality of videos satisfies a viewership rate specifying a rate of viewership over a predetermined period of time for the one or more of the plurality of videos; responsive to determining that the historical data associated with the one or more of the plurality of videos satisfies the viewership rate, determine the owner is eligible to participate in a video performance sharing program; and generate a communication for a client device associated with the owner of the plurality of videos to invite the owner to participate in the video performance sharing program.

17. The system of claim 16, the processor further configured to:

determine ownership of the plurality of videos, wherein determining that the owner is eligible to participate in the video performance sharing program is further based at least in part on determining that the owner has the ownership of the plurality of videos.

18. The system of claim 16, wherein the communication comprises a graphical input that allows the owner of the plurality of videos to activate features associated with the video performance sharing program.

19. The system of claim 16, the processor further configured to:

monitor user activity associate with the plurality of videos;

determine a popularity score corresponding to one or more of the plurality of videos based at least in part on the user activity associated with the plurality of videos; and determine whether the popularity score corresponding to the one or more of the plurality of videos satisfies a minimum popularity score, wherein to determine that the owner is eligible to participate in the video performance sharing program is further based at least in part on determining that the popularity score corresponding to the one or more of the plurality of videos satisfies the minimum popularity score.

20. The system of claim 16, wherein the processor further configured to:

receive an additional video submitted by the owner of the plurality of videos, the additional video owned by the owner and to be hosted at the asset hosting platform;

associate a secondary content item with the additional video, in response to determining the additional video is eligible to be presented with secondary content; and provide a reward to the owner of the additional video based at least in part on user accesses of the secondary content item.

\* \* \* \* \*